US012563157B1

(12) United States Patent (10) Patent No.: US 12,563,157 B1

Le et al. (45) Date of Patent: Feb. 24, 2026

(54) IDENTIFYING IMAGE FRAMES CONTAINING ERRORS IN AUTOMOTIVE SYSTEMS

(71) Applicant: QUALCOMM Incorporated, San Diego, CA (US)

(72) Inventors: Khoi Le, San Diego, CA (US); Rohan Desai, San Diego, CA (US); Rajakumar Govindaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/884,036

(22) Filed: Sep. 12, 2024

(51) Int. Cl.
    *G06F 3/14*     (2006.01)
    *H04L 1/00*     (2006.01)
    *H04N 7/035*     (2006.01)

(52) U.S. Cl.
    CPC ............. *H04N 7/0357* (2013.01); *G06F 3/14* (2013.01); *H04L 1/0072* (2013.01); *H04L 2001/0094* (2013.01)

(58) Field of Classification Search
    None
    See application file for complete search history.

(56) References Cited

U.S. PATENT DOCUMENTS

2021/0209390 A1   7/2021  Chae et al.
2022/0229794 A1*  7/2022  Fan ......................... G06F 13/24

OTHER PUBLICATIONS

International Search Report and Written Opinion—PCT/US2025/044938—ISA/EPO—Jan. 21, 2026.

* cited by examiner

*Primary Examiner* — Scott C Sun

(74) *Attorney, Agent, or Firm* — QUALCOMM Incorporated

(57) ABSTRACT

Aspects presented herein relate to methods and devices for communication including an apparatus, e.g., a vehicle. The apparatus may obtain a first interrupt request (IRQ) for a first frame in a set of frames associated with the frame processing. The apparatus may also store an indication of a first identifier (ID) for the first IRQ for the first frame. The apparatus may also determine an existence of a second IRQ for a second frame in the set of frames associated with the frame processing, where the second frame is subsequent to the first frame in the set of frames. The apparatus may also set, based on the determination, a first bit based on the existence of the second IRQ for the second frame or a second bit based on a nonexistence of the second IRQ for the second frame.

20 Claims, 18 Drawing Sheets

700

SOC 720

CPU 710

IRQ[n-1:0]

DDR Memory 708

ISP front end 706

MIPI CSI Receiver 704

Link errors are detected here

Image Data 703

Image Sensor 702

Errors may occur on link from image sensor to SOC

900

SOC
920

CPU
910

DDR Memory
908

IRQ[n-1:0]

ISP front
end
906

Ping-pong
timestamp register
914

MIPI CSI
Receiver
904

Ping-pong IRQ
register
914

IRQ[0]

Link errors are
detected here

Global
Timer
912

Image Data 903

Image Sensor
902

Errors may occur on
link from image
sensor to SOC

FIG. 11

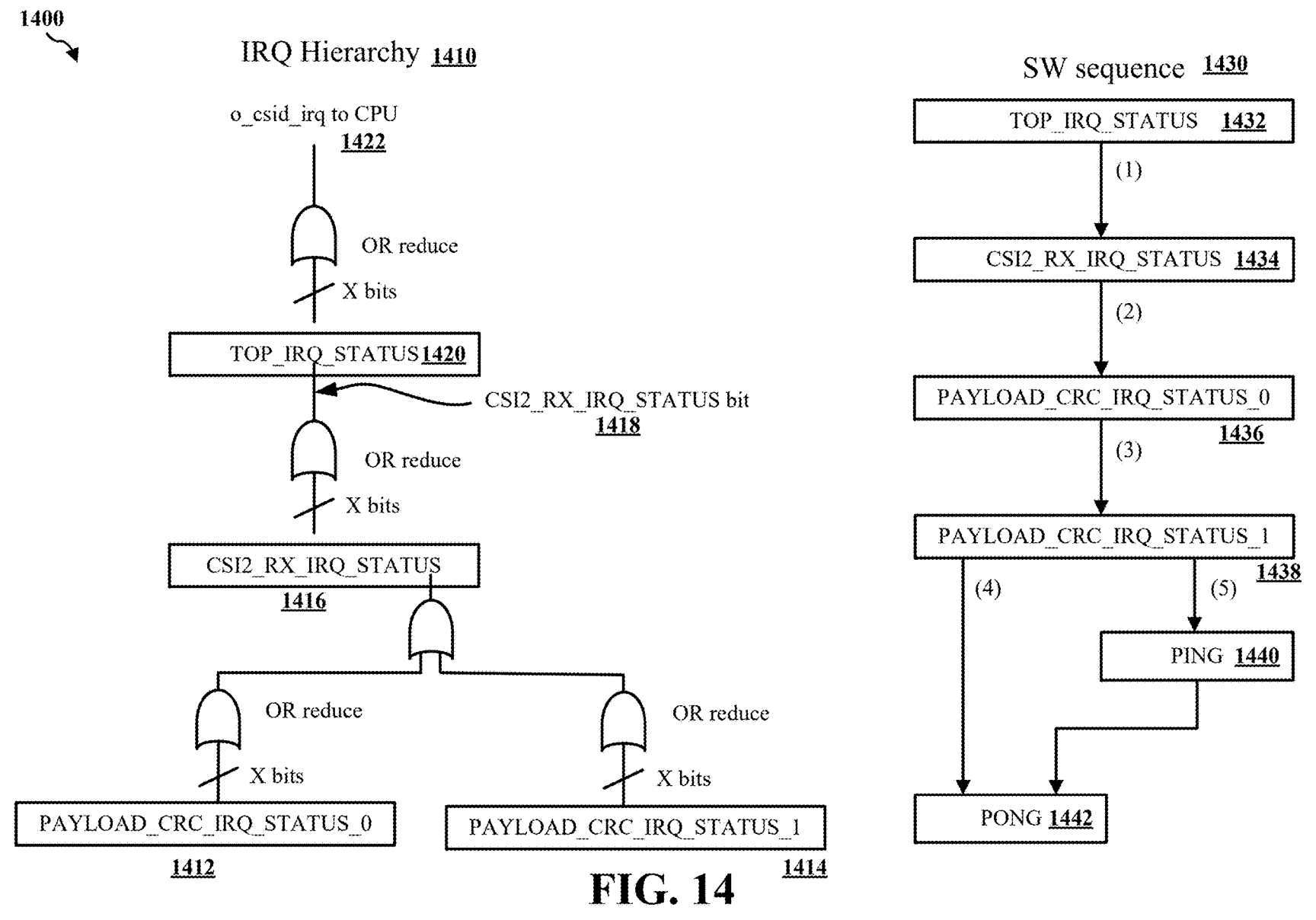

SW sequence 1430

TOP_IRQ_STATUS 1432

(1)

CSI2_RX_IRQ_STATUS 1434

(2)

PAYLOAD_CRC_IRQ_STATUS_0 1436

(3)

PAYLOAD_CRC_IRQ_STATUS_1 1438

(5)

PING 1440

(4)

PONG 1442

1400

IRQ Hierarchy 1410 o_csid_irq to CPU 1422

OR reduce

X bits

TOP_IRQ_STATUS 1420

CSI2_RX_IRQ_STATUS bit 1418

OR reduce

X bits

CSI2_RX_IRQ_STATUS 1416

OR reduce

X bits

PAYLOAD_CRC_IRQ_STATUS_1 1414

OR reduce

X bits

PAYLOAD_CRC_IRQ_STATUS_0 1412

FIG. 14

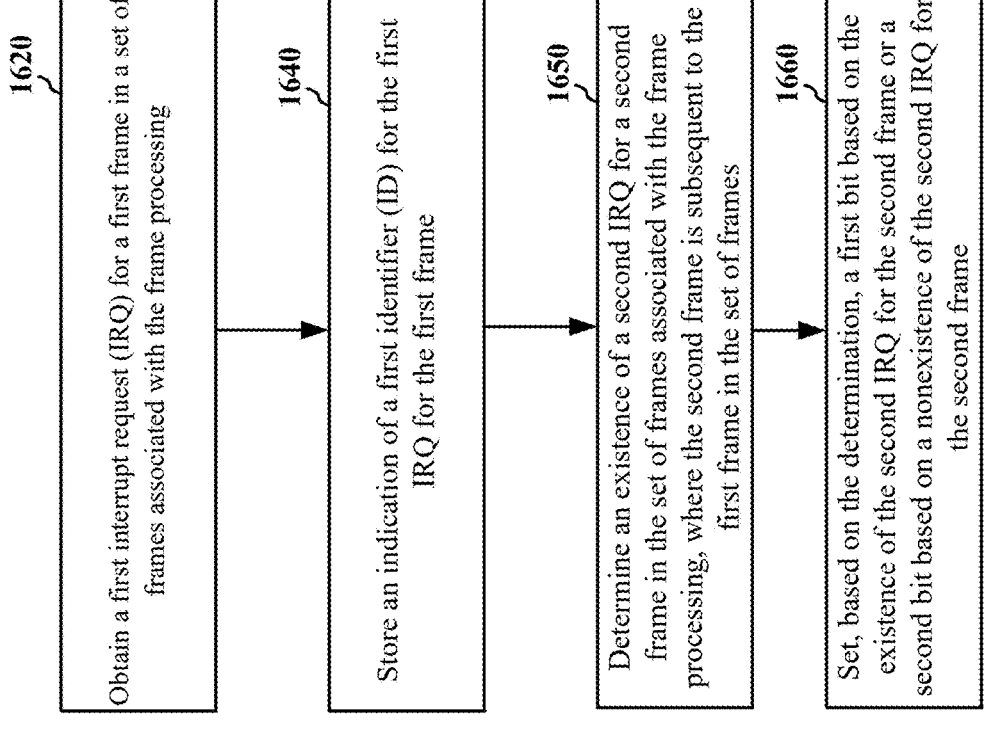

1620

Obtain a first interrupt request (IRQ) for a first frame in a set of frames associated with the frame processing

1640

Store an indication of a first identifier (ID) for the first IRQ for the first frame

1650

Determine an existence of a second IRQ for a second frame in the set of frames associated with the frame processing, where the second frame is subsequent to the first frame in the set of frames

1660

Set, based on the determination, a first bit based on the existence of the second IRQ for the second frame or a second bit based on a nonexistence of the second IRQ for the second frame

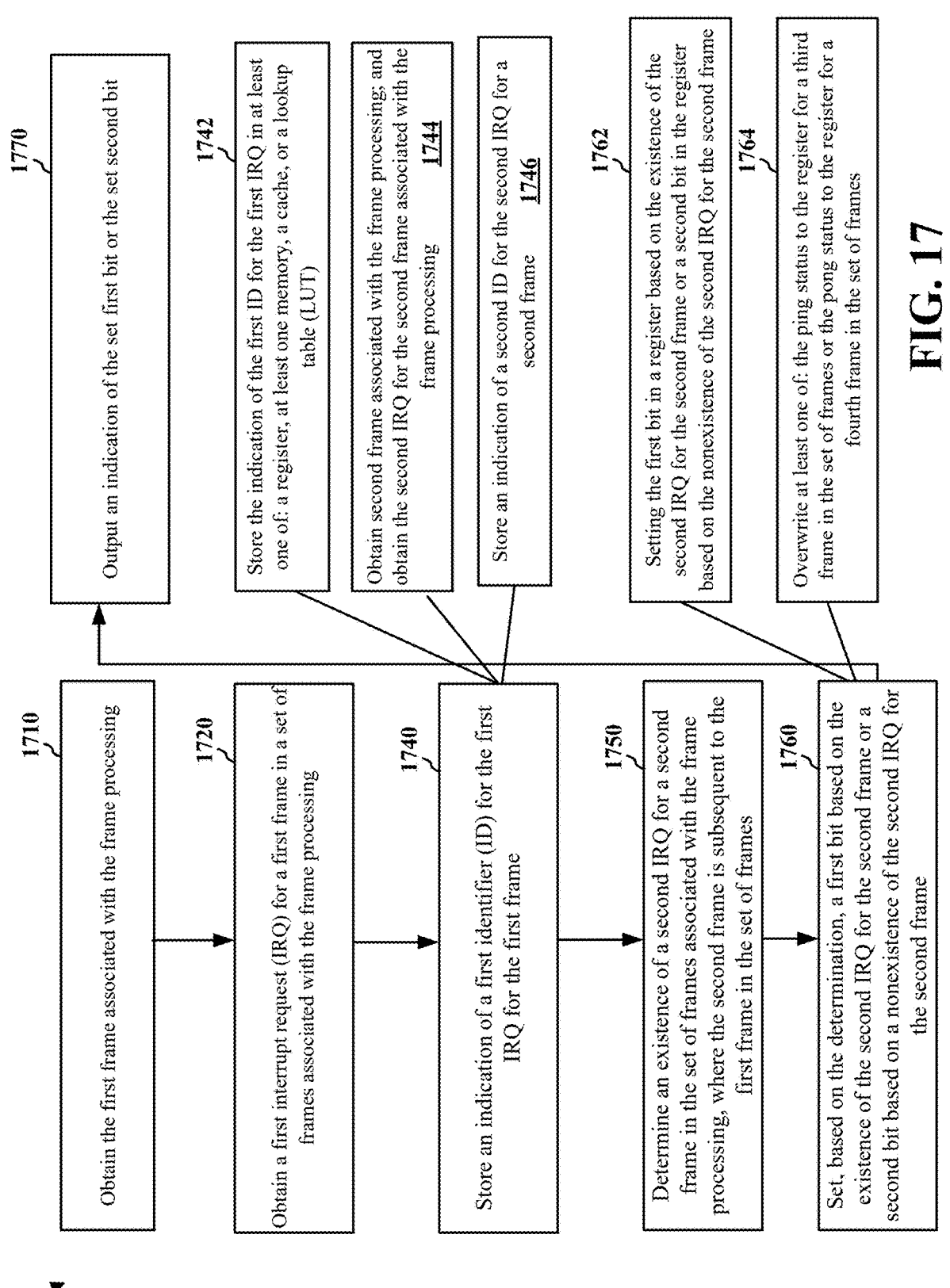

1710 Obtain the first frame associated with the frame processing

1720 Obtain a first interrupt request (IRQ) for a first frame in a set of frames associated with the frame processing 1740 Store an indication of a first identifier (ID) for the first IRQ for the first frame 1742 Store the indication of the first ID for the first IRQ in at least one of: a register, at least one memory, a cache, or a lookup table (LUT)

1744 Obtain second frame associated with the frame processing; and obtain the second IRQ for the second frame associated with the frame processing 1744

1746 Store an indication of a second ID for the second IRQ for a second frame 1746

1750 Determine an existence of a second IRQ for a second frame in the set of frames associated with the frame processing, where the second frame is subsequent to the first frame in the set of frames 1760 Set, based on the determination, a first bit based on the existence of the second IRQ for the second frame or a second bit based on a nonexistence of the second IRQ for the second frame 1762 Setting the first bit in a register based on the existence of the second frame or a second bit in the register based on the nonexistence of the second IRQ for the second frame 1764 Overwrite at least one of: the ping status to the register for a third frame in the set of frames or the pong status to the register for a fourth frame in the set of frames 1770 Output an indication of the set first bit or the set second bit

IDENTIFYING IMAGE FRAMES CONTAINING ERRORS IN AUTOMOTIVE SYSTEMS

TECHNICAL FIELD

The present disclosure relates generally to processing systems and, more particularly, to one or more techniques for autonomous driving.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved autonomous driving mechanisms.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a vehicle, a vehicle component, a system-on-chip (SoC), an electronic control unit (ECU), a user equipment (UE), a graphics processing unit (GPU), a central processing unit (CPU), or any apparatus that may perform communication. The apparatus may include at least one memory and at least one processor coupled to the at least one memory and, based at least in part on information stored in the at least one memory, the at least one processor, individually or in any combination, is configured to obtain a first interrupt request (IRQ) for a first frame in a set of frames associated with the frame processing. The at least one processor, individually or in any combination, is also configured to store an indication of a first identifier (ID) for the first IRQ for the first frame. The at least one processor, individually or in any combination, is also configured to determine an existence of a second IRQ for a second frame in the set of frames associated with the frame processing, where the second frame is subsequent to the first frame in the set of frames. The at least one processor, individually or in any combination, is also configured to set, based on the determination, a first bit based on the existence of the second IRQ for the second frame or a second bit based on a nonexistence of the second IRQ for the second frame.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 11 is a diagram illustrating an example of thirty-two virtual channels and thirty-two registers for ping-pong bits.

FIG. 14 is a diagram illustrating an example of interrupt request (IRQ) hierarchy and SW sequence.

FIG. 16 is a flowchart of an example method of communication.

FIG. 17 is a flowchart of an example method of communication.

DETAILED DESCRIPTION

Figure 1:
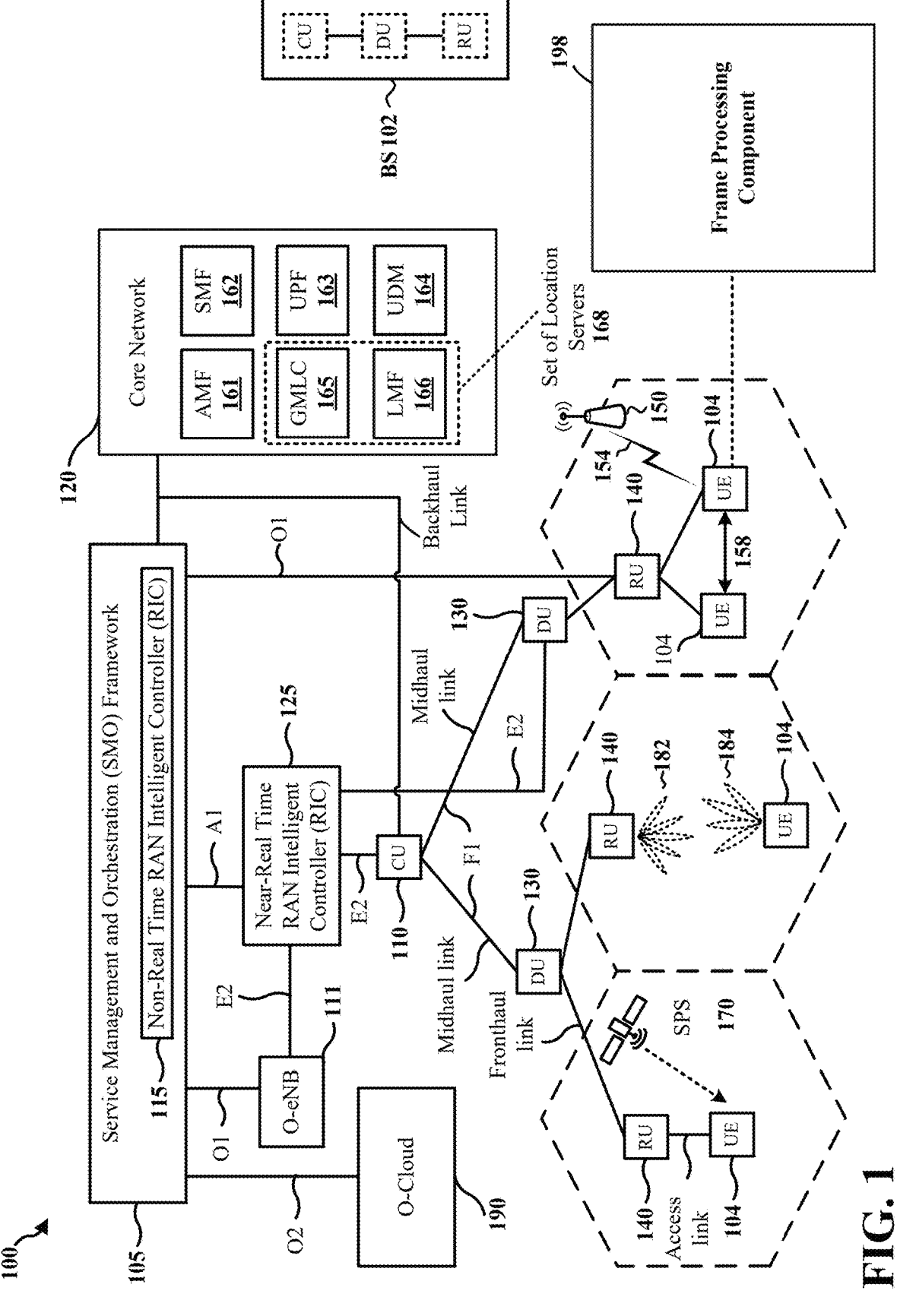
FIG. 1 is a diagram illustrating an example of a wireless communications system and an access network.

Aspects provided herein may improve error detecting in processing image data by using a system-on-chip (SOC) global timer (e.g., a timestamp based on the SOC global timer) and a ping-pong scheme to tag the bad frames. A timestamp may be appended as metadata to each frame as it is written to memory. This timestamp is used to uniquely identify each frame. At the same time, the timestamp and interrupt request (IRQ) may be captured into ping registers when an error is encountered.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHz, FRI is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
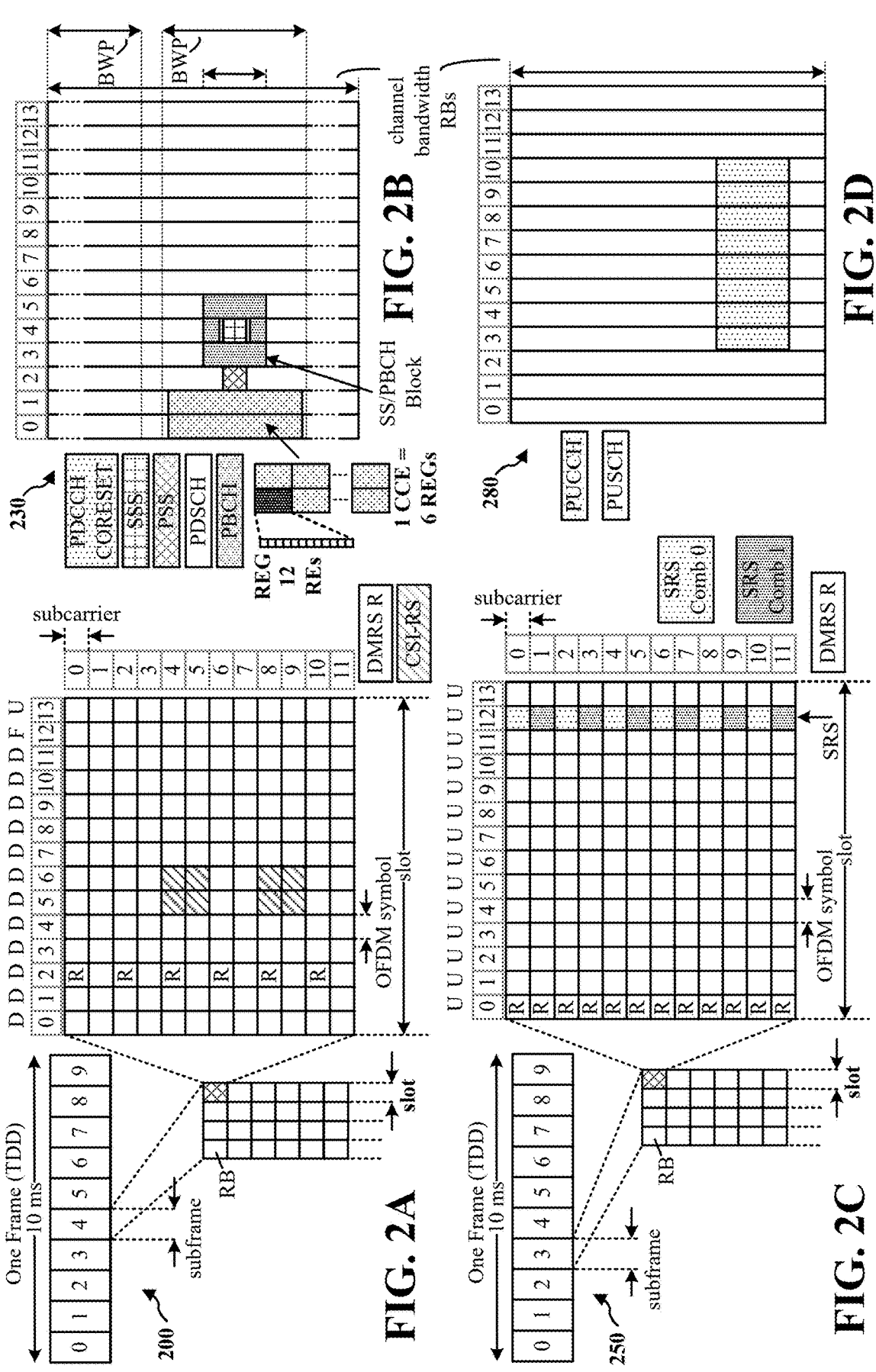
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

Referring again to FIG. 1, in certain aspects, the UE 104 may have a frame processing component 198. The frame processing component 198 may be configured to obtain a first interrupt request (IRQ) for a first frame in a set of frames associated with the frame processing. The frame processing component 198 may also be configured to store an indication of a first identifier (ID) for the first IRQ for the first frame. The frame processing component 198 may also be configured to determine an existence of a second IRQ for a second frame in the set of frames associated with the frame processing, where the second frame is subsequent to the first frame in the set of frames. The frame processing component 198 may also be configured to set, based on the determination, a first bit based on the existence of the second IRQ for the second frame or a second bit based on a nonexistence of the second IRQ for the second frame. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^\mu \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
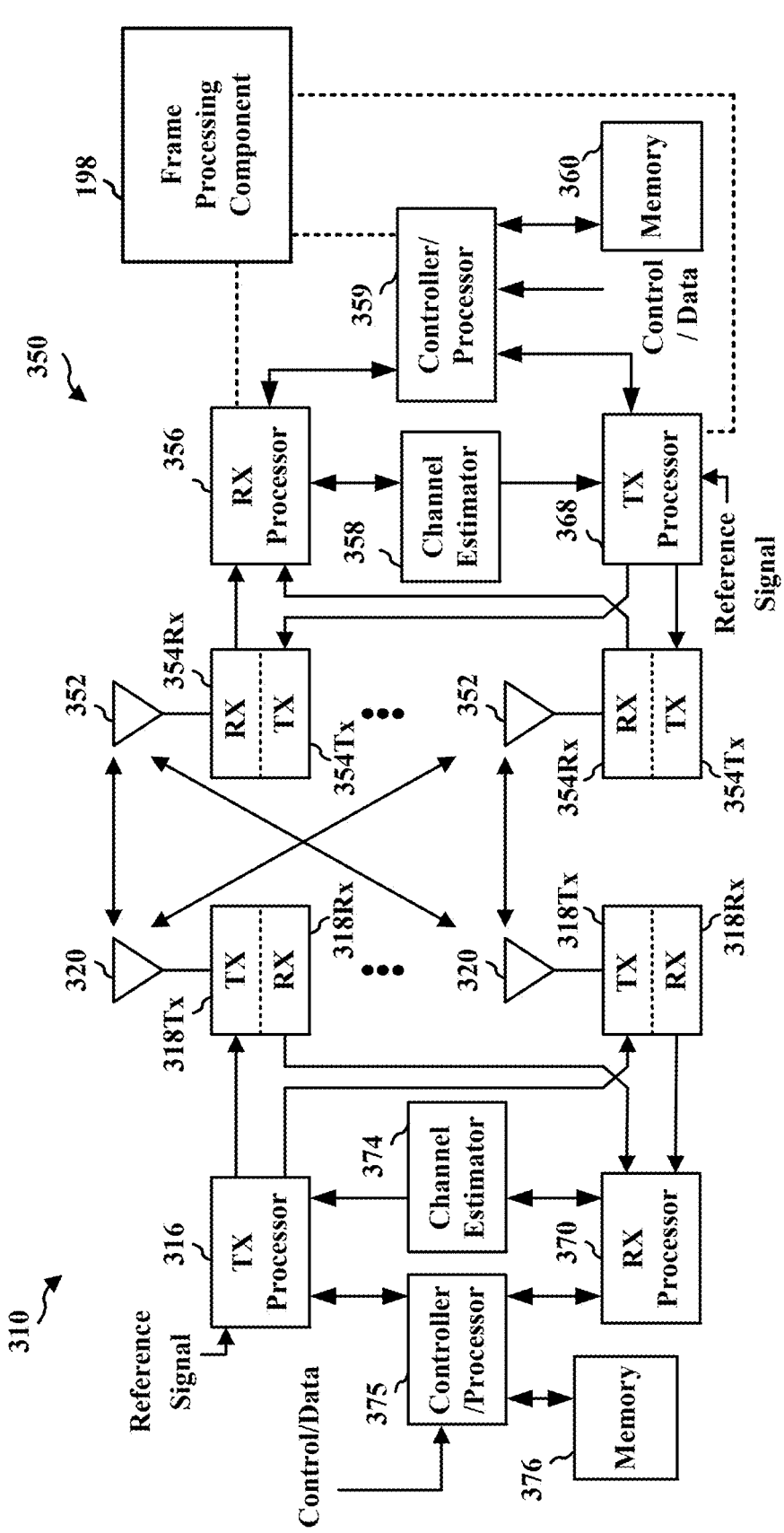
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the frame processing component 198 of FIG. 1.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

In some aspects, a display device may present frames at different frame rates on the first display panel and the second display panel. For instance, a display panel may present frames at 60 frames per second (FPS) on both the first display panel and the second display panel, 45 FPS on both the first display panel and the second display panel, etc. The display device may synchronize frame rates of content with refresh rates of the display panels (via a vertical synchronization process, which may be referred to as vsync, Vsync, VSync, or VSYNC). For instance, content may be available at 60 FPS and the first display panel and the second display panel may have a refresh rate of 95 Hz. Via Vsync, the refresh rate of the first display panel and the second display panel may be set to 60 Hz to match the 60 FPS content.

As indicated herein, VSync is a graphics technology that synchronizes the frame rate of an application/game with a refresh rate at a display (e.g., a display on a client device). Vsync may be utilized as a manner in which to deal with screen tearing (i.e., the screen displays portions of multiple frames at once). That can result in the display appearing to be split along a line. Tearing may occur when the display refresh rate (i.e., how many times the display updates per second) is not in synchronization with the frames per second (FPS). VSync signals may synchronize the display pipeline (e.g., the pipeline including application rendering, compositor, and a hardware composer (HWC) that presents images on the display). For instance, VSync signals may help to synchronize the time in which applications wake up to start rendering, the time the compositor wakes up to composite the screen, and the display refresh cycle. This synchronization may help to eliminate display refresh issues and improve visual performance. In some examples, the HWC may generates VSync events/signals and send the events/signals to the compositor.

Figure 4:
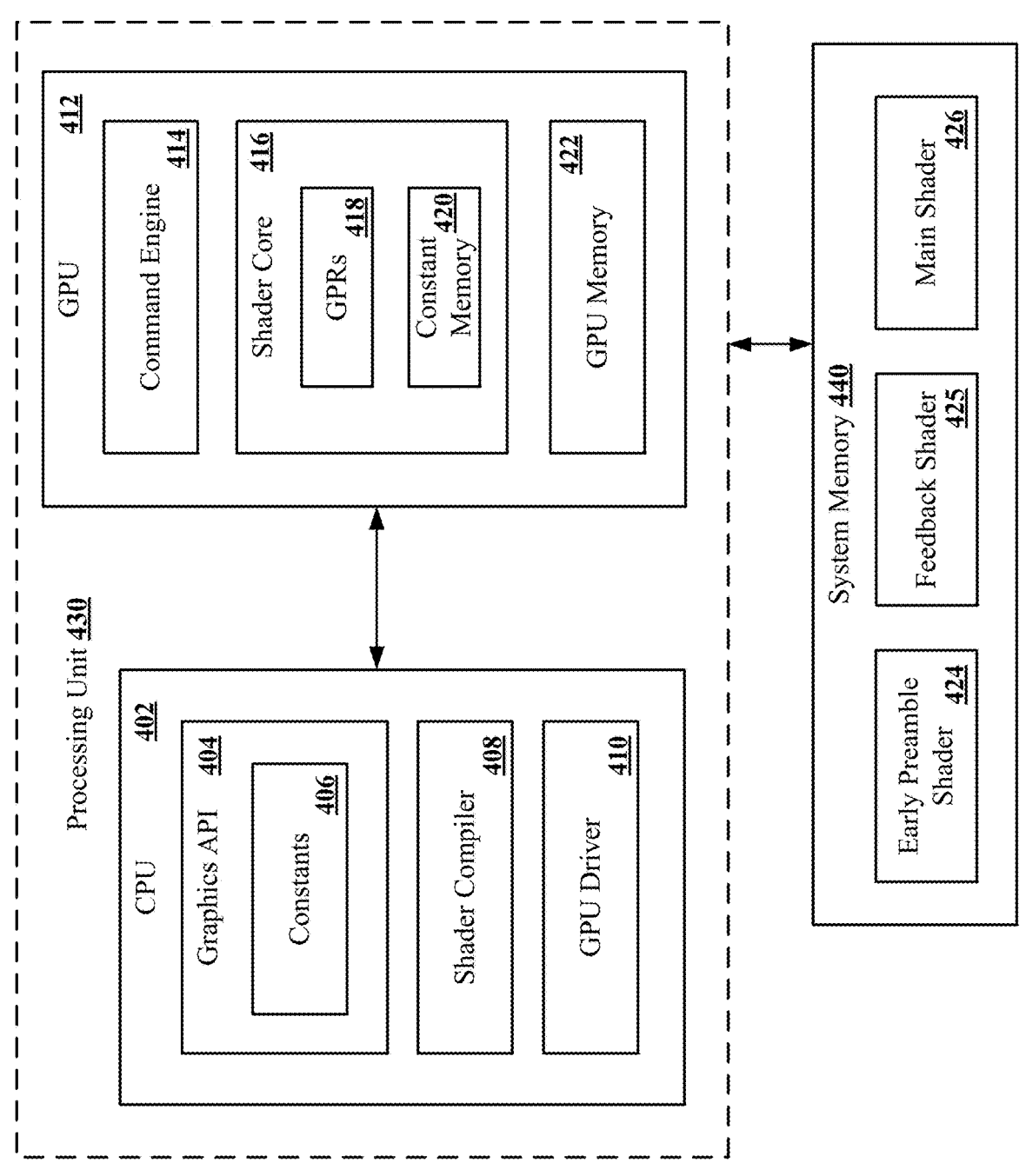
FIG. 4 is a diagram illustrating example processing for various components.

FIG. 4 is a diagram 400 that illustrates processing components, such as a processing unit 430 and the system memory 440, as may be identified in connection with a device for processing data. In aspects, the processing unit 430 may include a CPU 402 and a GPU 412. The GPU 412 and the CPU 402 may be formed as an integrated circuit (e.g., a system-on-a-chip (SOC)) and/or the GPU 412 may be incorporated onto a motherboard with the CPU 402. Alternatively, the CPU 402 and the GPU 412 may be configured as distinct processing units that are communicatively coupled to each other. For example, the GPU 412 may be incorporated on a graphics card that is installed in a port of the motherboard that includes the CPU 402.

The CPU 402 may be configured to execute a software application that causes graphical content to be displayed (e.g., on a display(s) of a device) based on one or more operations of the GPU 412. The software application may issue instructions to a graphics application program interface (API) 404, which may be a runtime program that translates instructions received from the software application into a format that is readable by a GPU driver 410. After receiving instructions from the software application via the graphics API 404, the GPU driver 410 may control an operation of the GPU 412 based on the instructions. For example, the GPU driver 410 may generate one or more command streams that are placed into the system memory 440, where the GPU 412 is instructed to execute the command streams (e.g., via one or more system calls). A command engine 414 included in the GPU 412 is configured to retrieve the one or more commands stored in the command streams. The command engine 414 may provide commands from the command stream for execution by the GPU 412. The command engine 414 may be hardware of the GPU 412, software/firmware executing on the GPU 412, or a combination thereof. While the GPU driver 410 is configured to implement the graphics API 404, the GPU driver 410 is not limited to being configured in accordance with any particular API. The system memory 440 may store the code for the GPU driver 410, which the CPU 402 may retrieve for execution. In examples, the GPU driver 410 may be configured to allow communication between the CPU 402 and the GPU 412, such as when the CPU 402 offloads graphics or non-graphics processing tasks to the GPU 412 via the GPU driver 410.

The system memory 440 may further store source code for one or more of an early preamble shader 424, a feedback shader 425, or a main shader 426. In such configurations, a shader compiler 408 executing on the CPU 402 may compile the source code of the shaders 424-426 to create object code or intermediate code executable by a shader core 416 of the GPU 412 during runtime (e.g., at the time when the shaders 424-426 are to be executed on the shader core 416). In some examples, the shader compiler 408 may pre-compile the shaders 424-426 and store the object code or intermediate code of the shader programs in the system memory 440. The shader compiler 408 (or in another example the GPU driver 410) executing on the CPU 402 may build a shader program with multiple components including the early preamble shader 424, the feedback shader 425, and the main shader 426. The main shader 426 may correspond to a portion or the entirety of the shader program that does not include the early preamble shader 424 or the feedback shader 425. The shader compiler 408 may receive instructions to compile the shader(s) 424-426 from a program executing on the CPU 402. The shader compiler 408 may also identify constant load instructions and common operations in the shader program for including the common operations within the early preamble shader 424 (rather than the main shader 426). The shader compiler 408 may identify such common instructions, for example, based on (presently undetermined) constants 406 to be included in the common instructions. The constants 406 may be defined within the graphics API 404 to be constant across an entire draw call. The shader compiler 408 may utilize instructions such as a preamble shader start to indicate a beginning of the early preamble shader 424 and a preamble shader end to indicate an end of the early preamble shader 424. Similar instructions may be used for the feedback shader 425 and the main shader 426. The feedback shader 425 will be described in further detail below.

The shader core 416 included in the GPU 412 may include general purpose registers (GPRs) 418 and constant memory 420. The GPRs 418 may correspond to a single GPR, a GPR file, and/or a GPR bank. Each GPR in the GPRs 418 may store data accessible to a single thread. The software and/or firmware executing on GPU 412 may be a shader program 424-426, which may execute on the shader core 416 of GPU 412. The shader core 416 may be configured to execute many instances of the same instructions of the same shader program in parallel. For example, the shader core 416 may execute the main shader 426 for each pixel that defines a given shape. The shader core 416 may transmit and receive data from applications executing on the CPU 402. In examples, constants 406 used for execution of the shaders 424-426 may be stored in a constant memory 420 (e.g., a read/write constant RAM) or the GPRs 418. The shader core 416 may load the constants 406 into the constant memory 420. In further examples, execution of the early preamble shader 424 or the feedback shader 425 may cause a constant value or a set of constant values to be stored in on-chip memory such as the constant memory 420 (e.g., constant RAM), the GPU memory 422, or the system memory 440. The constant memory 420 may include memory accessible by all aspects of the shader core 416 rather than just a particular portion reserved for a particular thread such as values held in the GPRs 418.

In recent years, vehicle manufacturers have been developing vehicles with assisted driving and/or autonomous driving capabilities. Assisted driving, which may also be called advanced driver assistance systems (ADAS), may refer to a set of technologies designed to enhance vehicle safety and improve the driving experience by providing assistance and automation to the driver. These technologies may use various sensor(s), such as camera(s), radar(s), light detection and ranging (lidar(s) or lidar sensor(s)), etc., and other components to monitor a vehicle's surroundings and assist the driver of the vehicle with certain driving tasks. For example, some features of assisted driving systems may include: (1) adaptive cruise control (ACC) (e.g., a system that automatically adjusts a vehicle's speed to maintain a safe following distance from the vehicle ahead), (2) lane-keeping assist (LKA) (e.g., a system that uses cameras to detect lane markings and helps keep the vehicle centered within the lane, and provides steering inputs to prevent unintentional lane departure), (3), autonomous emergency braking (AEB) (e.g., a system that detects potential collisions with obstacles or pedestrians and automatically apply the brakes to avoid or mitigate the impact), (4) blind spot monitoring (BSM) (e.g., a system that uses sensors to detect vehicles in a driver's blind spots and provides visual or audible alerts to avoid potential collisions during lane changes), (5) parking assistance (e.g., a system that assists drivers in parking their vehicles by using camera(s) and sensor(s) to help with parallel parking or maneuvering into tight spaces), and/or traffic sign recognition (e.g., camera(s) and image processing are used to recognize and display traffic signs such as speed limits, stop signs, and other road regulations on the vehicle's dashboard).

Autonomous driving, which may also be called as self-driving or driverless technology, may refer to the ability of a vehicle to navigate and operate itself without specifying human intervention (e.g., travelling from one place to another place without a human controlling the vehicle). The goal of the autonomous driving is to create vehicles that are capable of perceiving their surroundings, making decisions, and controlling their movements, all without the direct involvement of a human driver. To achieve or improve the autonomous driving, a vehicle may be specified to use a map (or map data) with detailed information, such as a high-definition (HD) map. An HD map may refer to a highly detailed and accurate digital map designed for use in autonomous driving and ADAS. In one example, HD maps may typically include one or more of: (1) geometric information (e.g., precise road geometry, including lane boundaries, curvature, slopes, and detailed 3D models of the surrounding environment), (2) lane-level information (e.g., information about individual lanes on the road, such as lane width, lane type (e.g., driving, turning, or parking lanes), and lane connectivity), (3) road attributes (e.g., data on road features like traffic signs, signals, traffic lights, speed limits, and road markings), (4) topology (e.g., information about the relationships between different roads, intersections, and connectivity patterns), (5) static objects (e.g., locations and details of fixed objects along the road, such as buildings, traffic barriers, and poles), (6) dynamic objects (e.g., real-time or frequently updated data about moving objects, like other vehicles, pedestrians, and cyclists), and/or (7) localization and positioning: precise reference points and landmarks that help in accurate vehicle localization on the map, etc.

Note while some assisted/autonomous driving systems may demand the use of HD map data, there are also assisted/autonomous driving systems and information systems that may be configured not to use HD map data (e.g., due to costs). For example, the Society of Automotive Engineers (SAE) has defined six levels of driving automation, from Level 0 (no automation) to Level 5 (full automation). For Level 0 (no automation), the human driver may be responsible for all aspects of driving, and the system may provide warnings or momentary assistance but does not take control of the vehicle. Example features for SAE Level 0 may include automatic emergency braking, blind spot warnings, and lane departure warnings, etc. As such, SAE Level 0 may not specify using HD map data. For Level 1 (driver assistance), the vehicle may assist with either steering or acceleration/deceleration (but may not perform both simultaneously). The human driver is still responsible for most driving tasks and may need to be ready to take over at any time. Example features for SAE Level 1 may include adaptive cruise control or lane-keeping assistance (e.g., lane centering), etc. For Level 2 (partial automation), the vehicle may control both steering and acceleration/deceleration under certain conditions, but the human driver is requested to remain engaged and monitor the driving environment at all times. Example features for SAE Level 2 may include ADAS, adaptive cruise control and lane-keeping assistance at the same time, etc. For Level 3 (conditional automation), the vehicle may perform all driving tasks under specific conditions, and the human driver may not be specified to monitor the environment but may need to be ready to take over when requested by the system. Example features for SAE Level 3 may include traffic jam chauffeur, where the vehicle is capable of handling driving in traffic jams without driver intervention. For Level 4 (high automation), the vehicle is capable of handling all driving tasks within certain conditions or environments (geofenced areas). The system may operate without human intervention but may specify a human driver outside its operational domain. Example features for SAE Level 4 may include local driverless taxi and pedals/steering, etc. For Level 5 (full automation), the vehicle is capable of performing all driving tasks under all conditions, and does not specify the human driver at any time. Example features for SAE Level 5 may include fully autonomous vehicles with no steering wheel or pedals. In summary, SAE Level 0 may be defined as features to provide warnings and assistance. ADAS is usually SAE Level 1 and 2, while AD is considered SAE level 3 to 5. Aspects presented herein (described below) may apply to all levels of SAE, including SAE Level 0 (e.g., for speed warning). For purposes of the present disclosure, a system or information system that is used in associated with SAE Level 0 to Level 5 may collectively be referred to as a "vehicle system," which may encompass the assisted driving and the autonomous driving.

To enable a vehicle to be capable of providing assisted driving and/or autonomous driving, the vehicle may be configured to use various machine learning (ML) and/or neural network (NN) frameworks. An ML/NN framework may refer to a set of tools, libraries, and/or software components that are configured to provide a structured way to design, build, and deploy ML/NN models and applications. These frameworks may be able to simplify the process of developing ML/NN algorithms and applications by providing a foundation of pre-built functions, algorithms, and utilities. They may typically include features for data preprocessing, model training, evaluation, and/or deployment, etc. ML/NN frameworks may come in various programming languages, and they may be configured to cater to different types of machine learning tasks, including supervised learning, unsupervised learning, and/or reinforcement learning, etc. An ML/NN model may refer to a mathematical representation of a real-world process or problem, created using ML/NN algorithms and techniques. These ML/NN models may be configured to make predictions, classify data, and/or solve specific tasks based on patterns and relationships learned from input data. A deep learning framework may refer to a specialized software library or toolset that provides specified components and abstractions for building, training, and deploying deep neural networks. Deep learning frameworks may be designed to facilitate the development of complex neural network models, especially deep neural networks with multiple layers. These frameworks may offer a wide range of pre-implemented layers, optimizers, loss functions, and other components, making it easier for researchers and developers to work with deep learning models.

Figure 5:
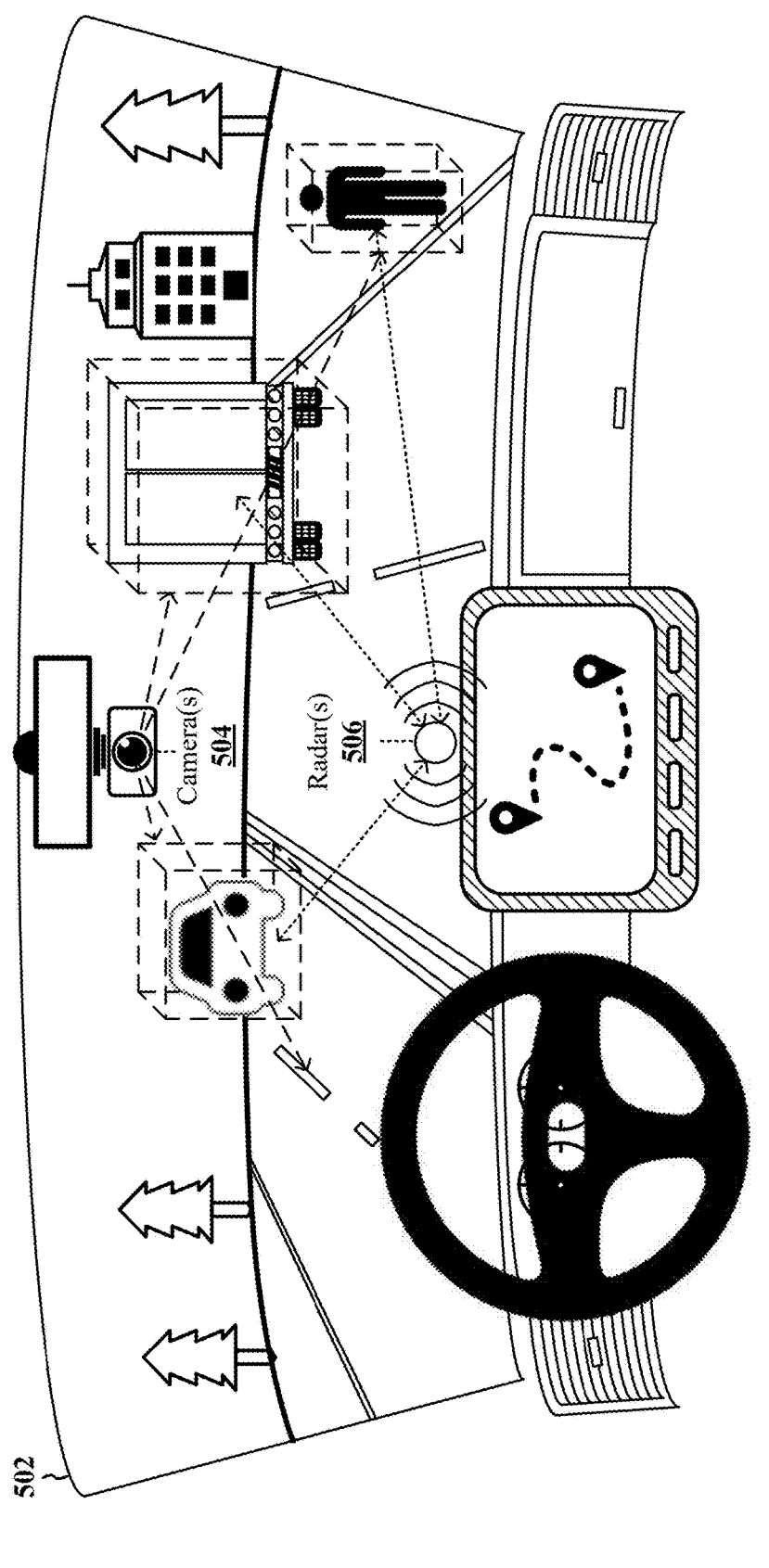
FIG. 5 is a diagram illustrating an example of a vehicle performing road object detection.

FIG. 5 is a diagram 500 illustrating an example of a vehicle performing road object detection using different types of sensors in accordance with various aspects of the present disclosure. In some implementations, a vehicle system may be configured to perform road object detections using multiple types of sensors (and also one or more ML/NN models). For purposes of the present disclosure, a road object or a traffic participant may refer to an object that is related to roads and driving, and is typically/commonly used/considered by the vehicle system in providing assisted driving or performing autonomous driving. In some examples, the road object/traffic participant may also be referred to as a traffic-related object. For example, a road object/traffic participant may be another vehicle, a pedestrian, a cyclist/bicycle, an animal, a traffic cone, a traffic sign, a traffic light, traffic, a traffic lane, a traffic line, a vulnerable road user (VRU), an object that is within a threshold distance of the vehicle, and/or any objects that may typically present on the roads (e.g., on the driving paths of vehicles), etc. On the other hand, a non-road object or a non-traffic participant (which may also be referred to as a non-traffic related object) may refer to an object that is not related to roads and driving, and is typically/commonly not used/considered by the vehicle system in providing assisted driving or performing autonomous driving. For example, a non-road object/non-traffic participant may be an object that is not within a threshold distance of the vehicle (e.g., a house on the side of the road, a mountain that is far away), an object that is not typically presented on a driving path/road (an airplane, a fire hydrant, a tree, etc.), a structure that is typically not traversed by vehicles (e.g., a pedestrian bridge), etc. An ML/NN model may be trained to identify whether an object is a road object or a non-road object.

For example, as shown by the diagram 500, a vehicle or a vehicle system (collectively as a "UE 502") may be configured to use different types of sensors, such as a set of cameras 504 and/or a set of radars 506 for detecting road objects. For purposes of the present disclosure, the term "radar" may broadly refer to a device/component that is capable of detecting at least the presence and/or the distance of a physical object. Examples of radar may include an RF radar, a sonar, an ultrasonic sensor, a light detection and ranging (lidar), etc. In some implementations, the UE 502 may also use different MN/NN models for identifying different types of road objects. For example, a first ML/NN model may be trained/used to detect and track polylines from sensor output(s) (e.g., images captured by the camera(s) of the vehicle, point clouds generated from radar(s)/lidar(s), etc.), while a second ML/NN model may be trained/used to detect and track objects in a three-dimensional (3D) space (e.g., to perform 3D object detection (3DOD) tasks). Then, the outputs of different types of sensors (e.g., from the set of cameras 504 and the set of radars 506) may be processed and used by the ADAS or the autonomous driving system (e.g., for assisted/autonomous driving). A point cloud may refer to a discrete set of data points in space, where these points may represent a 3D shape or object. In some implementations, each point position may be associated with a set of Cartesian coordinates (X, Y, Z). Point clouds may be produced by radar(s)/lidar(s) by detecting multiple points on the external surfaces of objects.

As described in connection with FIG. 5, various applications (e.g., use cases) such as assisted driving and/or autonomous driving, may specify the use of map data. To keep the map data up-to-date, these applications (or devices running these applications) may be configured to download updated map data from a server from time to time or based on certain pre-defined conditions (e.g., when travelling to an area that is without map data). In some implementations, downloading map data from a server may be referred to as "map over the air" (MOTA).

Figure 6:
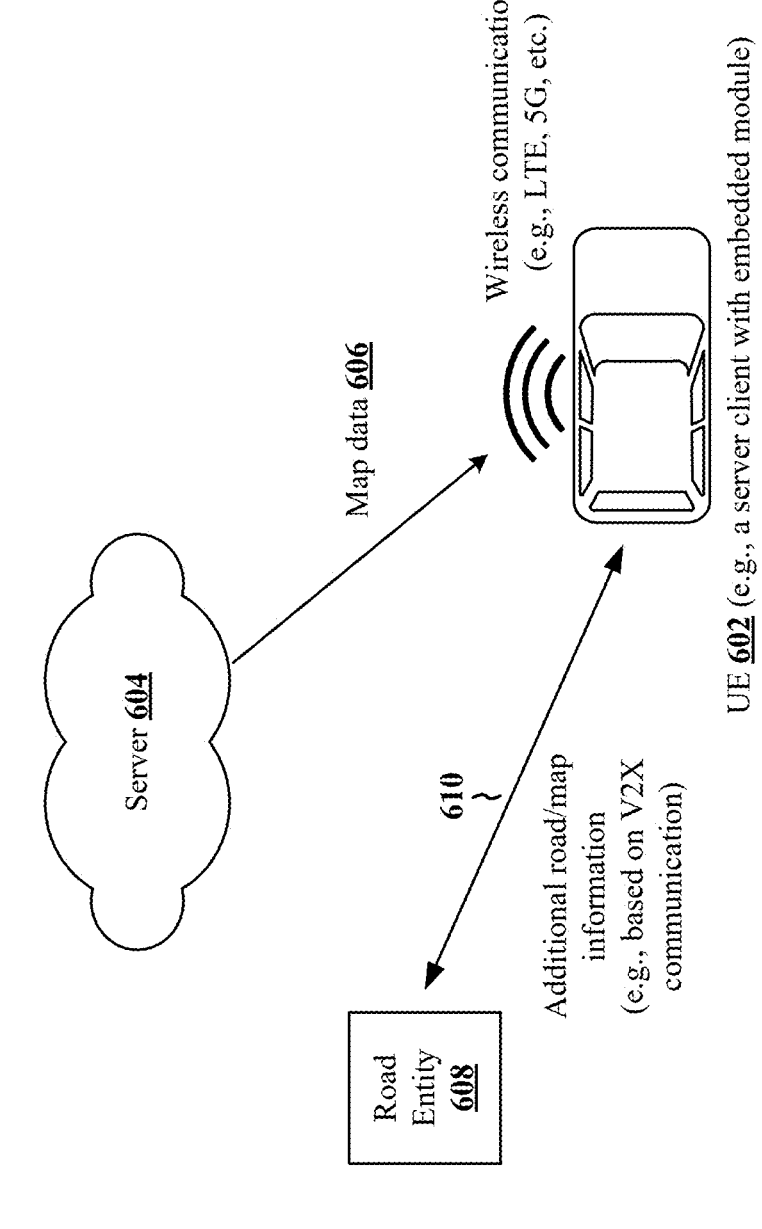
FIG. 6 is a diagram illustrating an example of a vehicle performing a map over-the-air process.

FIG. 6 is a diagram 600 illustrating an example of a vehicle performing map over the air in accordance with various aspects of the present disclosure. In one example, map over the air may refer to a process of a server 604 sending (real-time) map data 606 to a UE 602 (e.g., a vehicle, a vehicle system, an on-board unit (OBU) of the vehicle, a device running a navigation application, etc.) over a wireless network/communication (e.g., an LTE network, a 5G network, etc.), enabling the UE 602 to make decisions based on the latest information about the road and traffic conditions. Depending on implementations and conditions, different amount of map data 606 may be downloaded by the UE 602 from the server 604. For example, in some scenarios, the UE 602 may be configured to (1) download map data before driving, (2) download just updates for road conditions (e.g., traffic jams, construction work, etc.) while driving, (3) continuously download updated map data whenever available, or (4) a combination thereof (e.g., the UE 602 may download map data before driving, and continuously to download the updates while driving, including changes in map data (e.g., newly opened or closed street/highway, short term construction work). In some scenarios, the UE 602 may also be configured to stream the map data 606, which means the UE 602 does not download the map data before driving (e.g., the map data is streamed in real-time while the UE 602 is driving).

In an example implementation, the map data 606 is transmitted from the server 604 (e.g., a cloud-based system), where the server 604 may utilize sensors and other data sources to collect and analyze information about the road network and traffic patterns. For example, the server 604 may receive and gather traffic/road information provided by a group of UEs (e.g., vehicles, roadside units (RSUs), etc.). In some examples, the information/data collected by a server from multiple UEs may be referred to as "fleet data" or "crowdsourced/crowdsourcing data." This data may be processed and combined with other data, such as GPS/GNSS and/or camera data from multiple users (e.g., from other UEs/vehicles and/or the UE 602) to create a detailed map of the environment in real-time. Then, an application (e.g., for autonomous driving, navigation, positioning, etc.) of the UE 602 may access the map data 606 over a wireless network (e.g., a cellular or satellite network), and use the map data 606 to make decisions about speed, route, and other factors, etc. For example, the UE 602 may use the map data 606 to avoid road construction, traffic congestion, or accidents, and to optimize its route for efficiency and safety, etc. In some examples, as shown at 610, the UE 602 may also be configured to receive (additional) road/map information from another road entity 608, such as from another vehicle/ UE, a roadside unit (RSU), or a traffic/road infrastructure (e.g., traffic lights), such as based on vehicle-to-everything (V2X) communication protocol/technology.

Map data with lane-level information, such as road-maps with lane-level connectivity, may play a crucial role in enhancing the safety, the efficiency, and/or the overall performance of autonomous driving systems and ADAS systems, and may also contribute to the realization of a safer and more connected transportation future. For purposes of the present disclosure, a map data with lane-level information/connectivity may be referred to as a "lane-map," a "lane-level map," "lane-map data," and/or "lane-level map data," etc., which may indicate that the map data includes information related to different lanes of a road. In addition, depending on the context, the term "map data" may be used interchangeably with the term "map."

Figure 7:
FIG. 7 is a diagram illustrating an example of processing image data and detecting link errors.

FIG. 7 is a diagram 700 illustrating an example of processing image data and detecting link errors. For processing of image data, errors can be introduced as image data 703 is sent from image sensor 702 to SOC 720. The connections between camera and SOC may be mobile industry processor interface (MIPI) camera serial interface (CSI) and Gigabit multimedia serial link 2 (GMSL2). GMSL2 is used for long distance connection and MIPI CSI used for the last short distance leg. Some errors, such as 1-bit ECC and packet payload checksum, are not detrimental to normal hardware (HW) operation but can cause image degradation and artifacts. These errors may be detected on the MIPI CSI receiver 704 and flagged to software (SW) via interrupts. The MIPI CSI receiver 704 may receive the image data 703 and detect the link errors. For example, image signal processor (ISP) front end 706 may receive the processed image data 703 from the MIPI CSI receiver 704 and may store those in the DDR memory 708. IRQ may be fed into the CPU 710.

There may be no local RAM buffer in the MIPI CSI receiver 704. Therefore, the image data 703 may be sent directly to DDR memory 708 even with errors. SW response to interrupts may be slow due to CPU loads at the CPU 710, which may take up to two frame time to respond. This means that two frames of image data have already been written to the DDR memory 708 when SW responds. But SW may flag which frame has error to the next process that consumes the frame. But because SW may be 2 frames late in responding, it may lose track which frame had error. If SW is able to respond to each IRQ immediately, then it can synchronize and track which frame it is on. But due to loading, such immediate response may not be guaranteed. If SW is able to identify the frame with error, the SW can perform one of several actions: discard the frame or mark the frame as bad for the next consumer of the frame, or other actions. The next consumer of the frame may be an artificial intelligence (AI) or machine learning (ML) algorithm, which may be better suited to a frame without artifacts. If the frame has many errors (corruptions), the AI/ML algorithm may produce erroneous results/outputs. Such errors may also extend to cybersecurity use cases (such as face authentication) and multi-chip use cases where a bad frame cannot reliably be used.

Figure 8:
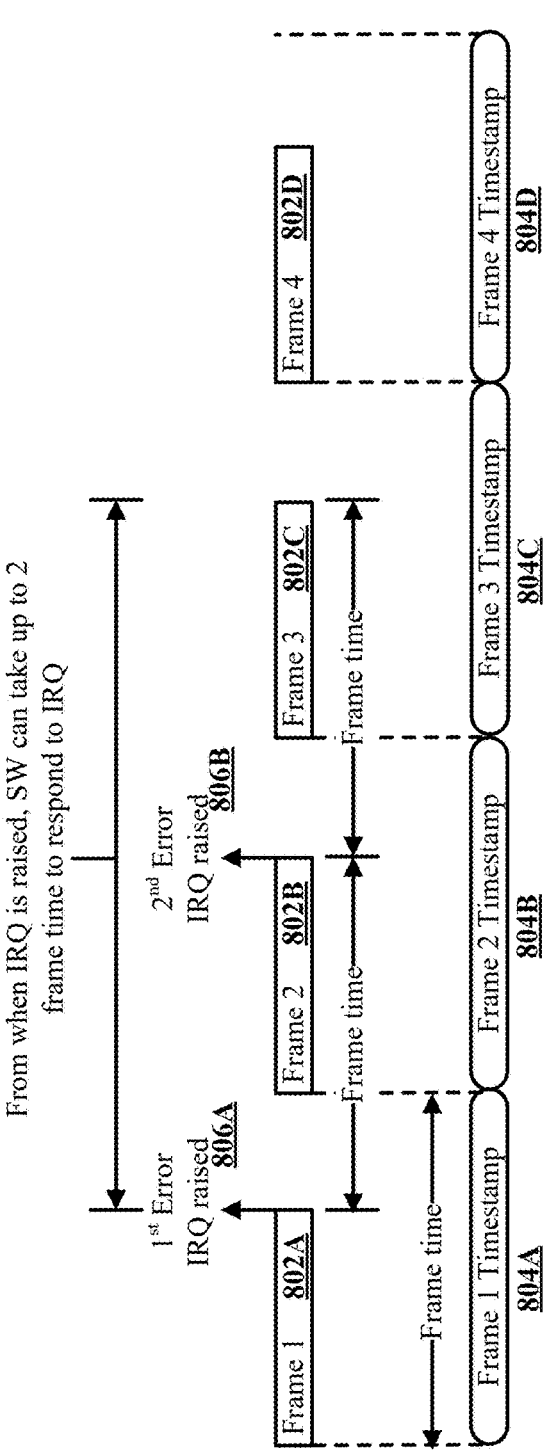
FIG. 8 is a diagram illustrating an example of time frames associated with processing image data.

FIG. 8 is a diagram 800 illustrating an example of time frames associated with processing image data. As illustrate in FIG. 8, there may be a first frame 802A associated with a frame 1 time stamp 804A, a second frame 802B associated with a frame 2 time stamp 804B, a third frame 802C associated with a frame 3 time stamp 804C, and a fourth frame 802D associated with a frame 4 time stamp 804D. A first error may be detected at 806A and IRQ may be raised. From such time when IRQ is raised, SW may take up to two frame time to respond to the IRQ. Therefore, by the time SW responds, up to 2 frames may have already been received and written to the DDR memory. SW may not be able to determine on which frame the error occurred. In the elapsing time, a second IRQ might raise at 806B.

Aspects provided herein may improve error detecting in processing image data by using a system-on-chip (SOC) global timer (e.g., a timestamp based on the SOC global timer) and a ping-pong scheme to tag the bad frames. A timestamp may be appended as metadata to each frame as it is written to memory. This timestamp is used to uniquely identify each frame. At the same time, the timestamp and IRQ may be captured into ping registers when an error is encountered.

Figure 9:
FIG. 9 is a diagram illustrating an example of processing image data and processing link errors.

FIG. 9 is a diagram 900 illustrating an example of processing image data and processing link errors. For processing of image data, errors can be introduced as image data 903 is sent from image sensor 902 to SOC 920. The connections between camera and SOC may be mobile industry processor interface (MIPI) camera serial interface (CSI) and gigabit multimedia serial link 2 (GMSL2). GMSL2 is used for long distance connection and MIPI CSI used for the last short distance leg. Some errors, such as 1-bit ECC and packet payload checksum, are not detrimental to normal hardware (HW) operation but can cause image degradation and artifacts. These errors may be detected on the MIPI CSI receiver 904 and flagged to software (SW) via interrupts. The MIPI CSI receiver 904 may receive the image data 903 and detect the link errors. For example, image signal processor (ISP) front end 906 may receive the processed image data 903 from the MIPI CSI receiver 904 and may store those in the DDR memory 908. IRQ may be fed into the CPU 910. The MIPI CSI receiver 904 may capture and store timestamp based on global timer 912 and IRQs into ping-pong SW registers 914, including ping-pong IRQ register and ping-pong timestamp register, when error is encountered. The global timer 912 may also be used by the ISP front end 906 and stored in the DDR memory 908 as appended meta data to each frame as each frame is written to the DDR memory 908.

Figures 10A, 10B:
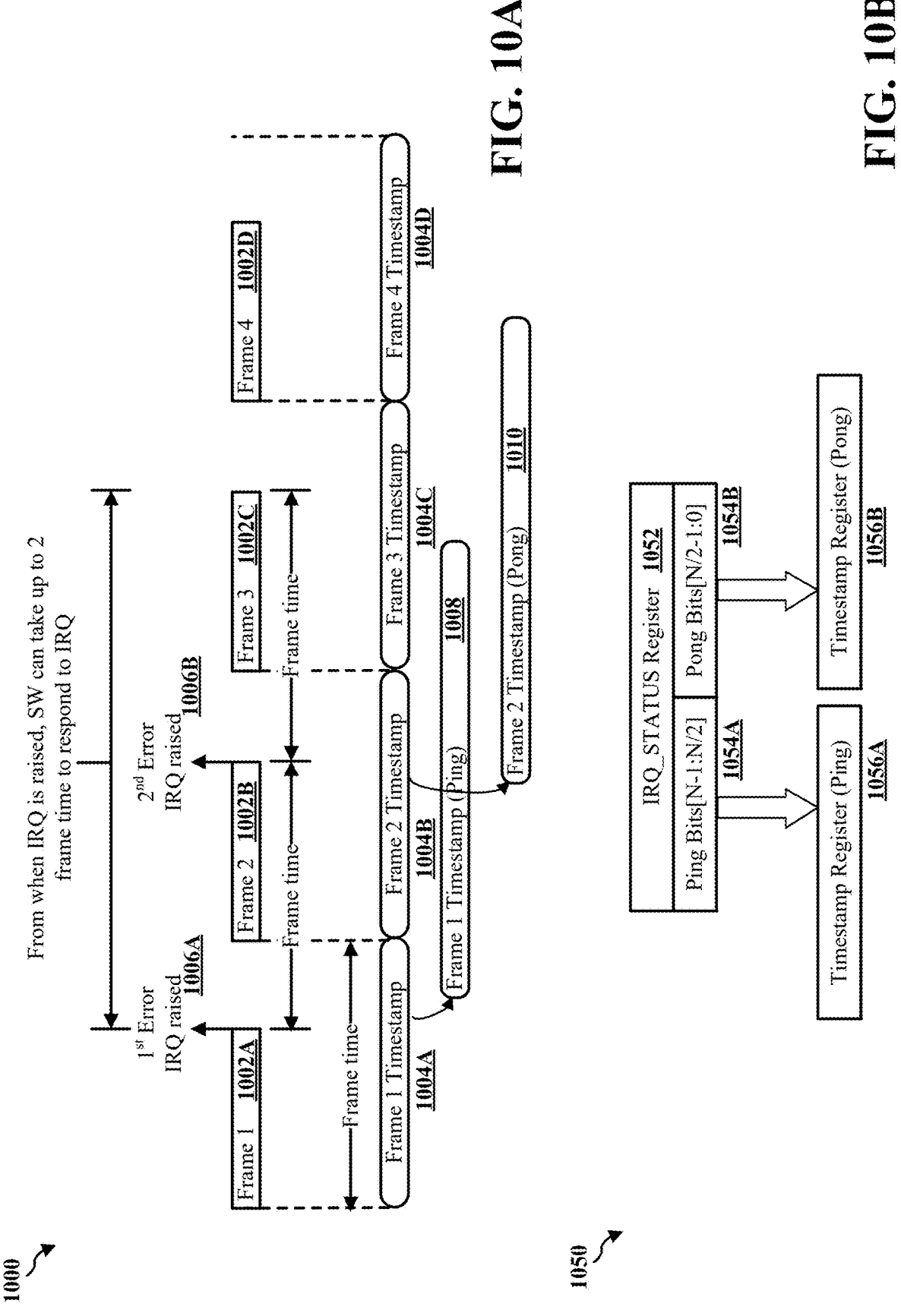
FIG. 10A is a diagram illustrating an example of processing image data with ping-pong software (SW) registers.
FIG. 10B is a diagram illustrating an example of register for ping-pong bits.

In some aspects, to process the image data, the processor may capture and store the timestamp into a ping-pong SW register each time an error IRQ is raised, alternating between ping and pong every other frame. For example, even frames may correspond to the ping and odd frames correspond to the pong. The IRQs are stored, also, in a ping-pong manner, corresponding to the timestamp. When SW services an interrupt, based on if IRQ status is captured in the ping or the pong register, SW reads the corresponding timestamp in the ping or the pong register. As an example, such a solution may be good for two frames using the ping-pong scheme because the worst delay SW may encounter is two frames. But if more than two frames may occur, then a circular buffer may be used instead. For example, instead of using ping-pong register, a circular buffer register (e.g., with more than two types of registers, such as a first type, a second type, and a third type of registers) may be used. FIG. 10A is a diagram 1000 illustrating an example of processing image data with ping-pong SW registers. As illustrate in FIG. 10A, there may be a first frame 1002A associated with a frame 1 time stamp 1004A, a second frame 1002B associated with a frame 2 time stamp 1004B, a third frame 1002C associated with a frame 3 time stamp 1004C, and a fourth frame 1002D associated with a frame 4 time stamp 1004D. A first error may be detected at 1006A and IRQ may be raised A second IRQ might raise at 1006B. Because timestamp may be captured and stored into a ping-pong SW register each time an error IRQ is raised (e.g., alternating between ping and pong every other frame where even frames corresponds to the ping and odd frames correspond to the pong), the IRQs may also be stored in a ping-pong manner corresponding to the timestamp. When SW services an interrupt, based on if IRQ status is captured in the ping or the pong register, SW reads the corresponding timestamp in the ping or the pong register. For example, for the first IRQ at 1006A, the ping timestamp 1008 may be identified and for the second IRQ at 1006B, a pong timestamp 1010 may be identified. Therefore, based on whether it's associated with ping timestamp or pong timestamp once the IRQ is received, the frame number associated with the IRQ may be accordingly determined.

FIG. 10B is a diagram 1050 illustrating an example of register for ping-pong bits. As illustrated in FIG. 10B, in an IRQ status register 1052, there may be a number of ping bits 1054A and a number of pong bits 1054B stored. The ping bits 1054A may be associated with a timestamp register 1056A for the ping bits and the pong bits 1054B may be associated with a timestamp register 1056B for the pong bits.

Figure 11:
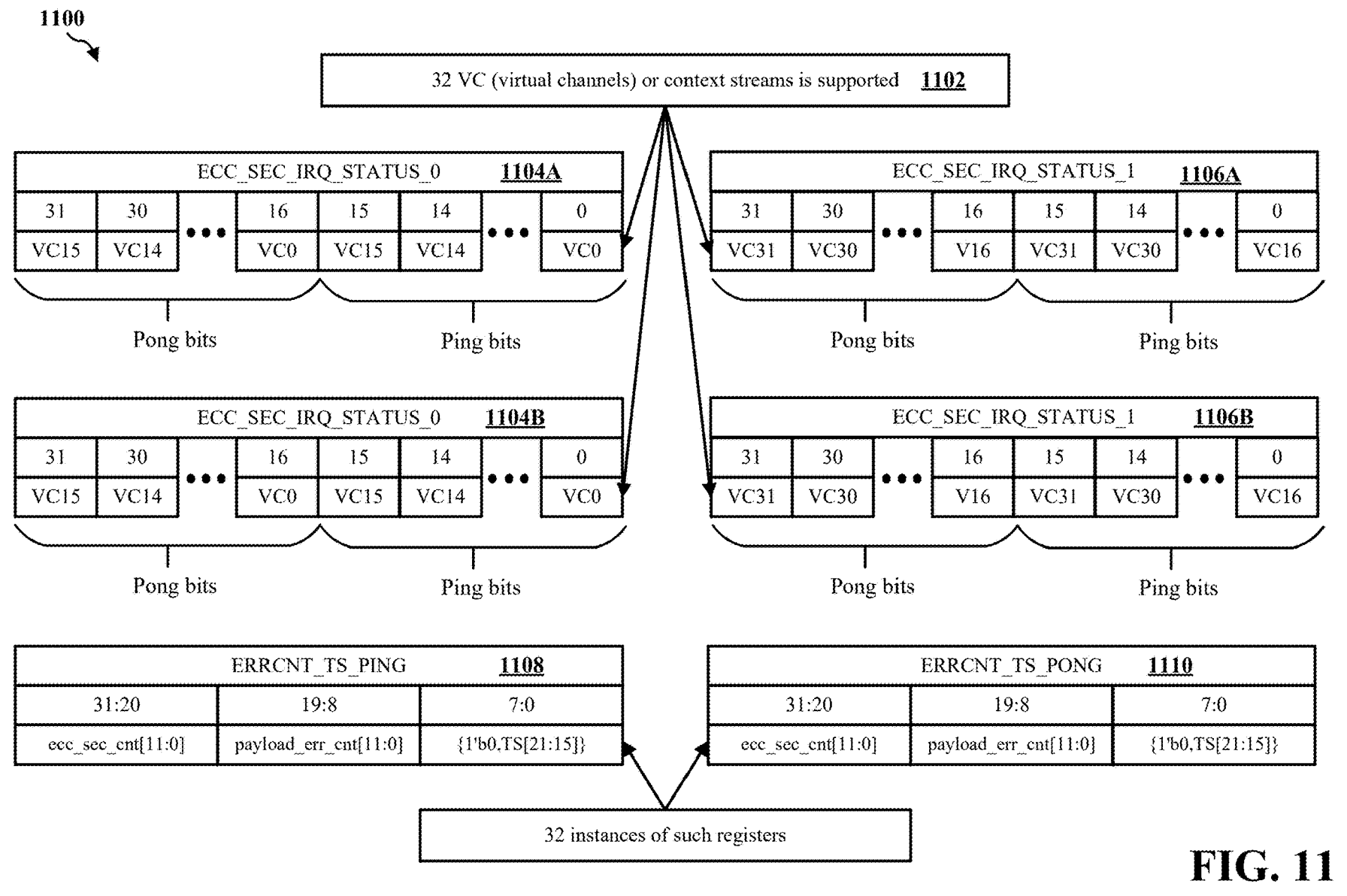

FIG. 11 is a diagram 1100 illustrating an example of thirty-two virtual channels and thirty-two registers for ping-pong bits. As illustrated in FIG. 11, for thirty virtual channels or context streams supported at 1102, there may be a first error correction code (ECC) single error correcting (SEC) IRQ status register 1104A with sixteen registers for ping bits and associated timestamps and sixteen registers for pong bits and associated timestamps, and a second ECC SEC IRQ status register 1106A with sixteen registers for ping bits and associated timestamps and sixteen registers for pong bits and associated timestamps. Each of the ECC SEC IRQ status register may be associated with a payload cyclic redundancy check (CRC) IRQ status register, also with sixteen registers for ping bits and associated timestamps and sixteen registers for pong bits and associated timestamps. For example, there may be a first payload CRC IRQ status register 1104B and a second payload CRC IRQ status register 1106B. For each ping, an error count timestamp ping (ERRCNT_TS_PING 1108) may include bits for ECC SEC count, bits for payload error count, and bits for timestamp. Similarly, an error count timestamp pong (ERRCNT_TS_PONG 1110) may include bits for ECC SEC count, bits for payload error count, and bits for timestamp.

Figure 12:
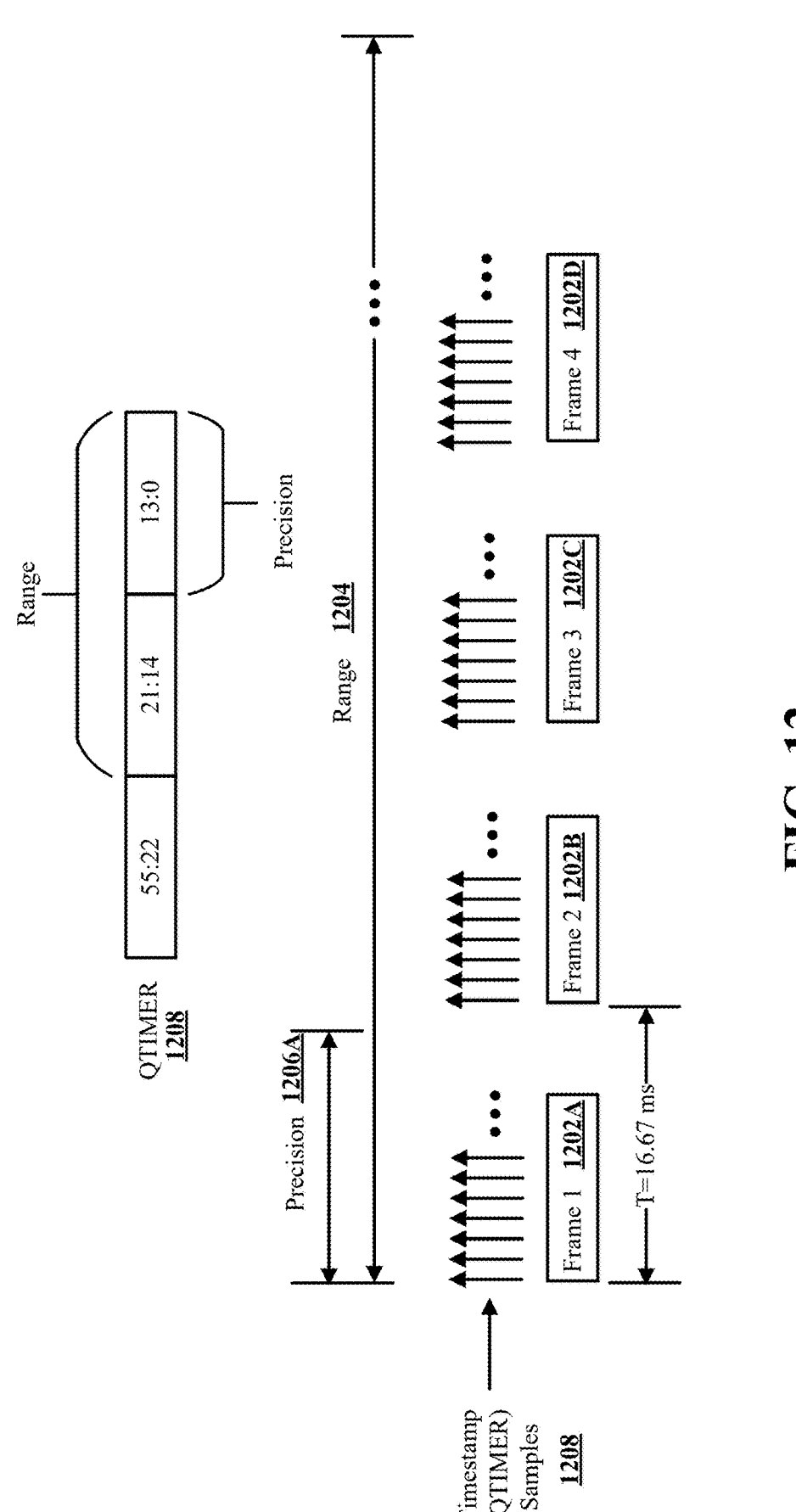
FIG. 12 is a diagram illustrating an example of timestamp bits.

FIG. 12 is a diagram 1200 illustrating an example of timestamp bits. As an example, for 60 frames per second (fps) which 16.67 millisecond (ms) period per frame and given XO clock period of 52 nanoseconds (ns) (19.2 MHz frequency), there may be 21 lower bits of 56-bit QTIMER (e.g., a global timer) (in the timestamp samples 1208) used to capture timestamp of frames. The 21 bits may provide a range 1204 of up to 109 ms. The range 1204 covers over 3 frames of 33 ms period, or over 6 frames of 16 ms period, which may include a first frame 1202A, a second frame 1202B, A third frame 1202C, and a fourth frame 1202D. The lower 15 bits of 21 bits may be dropped to reduce QTIMER sampling period (precision 1206A) to 1.7 ms, and six bits (e.g., bits 20:15) of QTIMER may be used for ping-pong timestamp.

Figure 13:
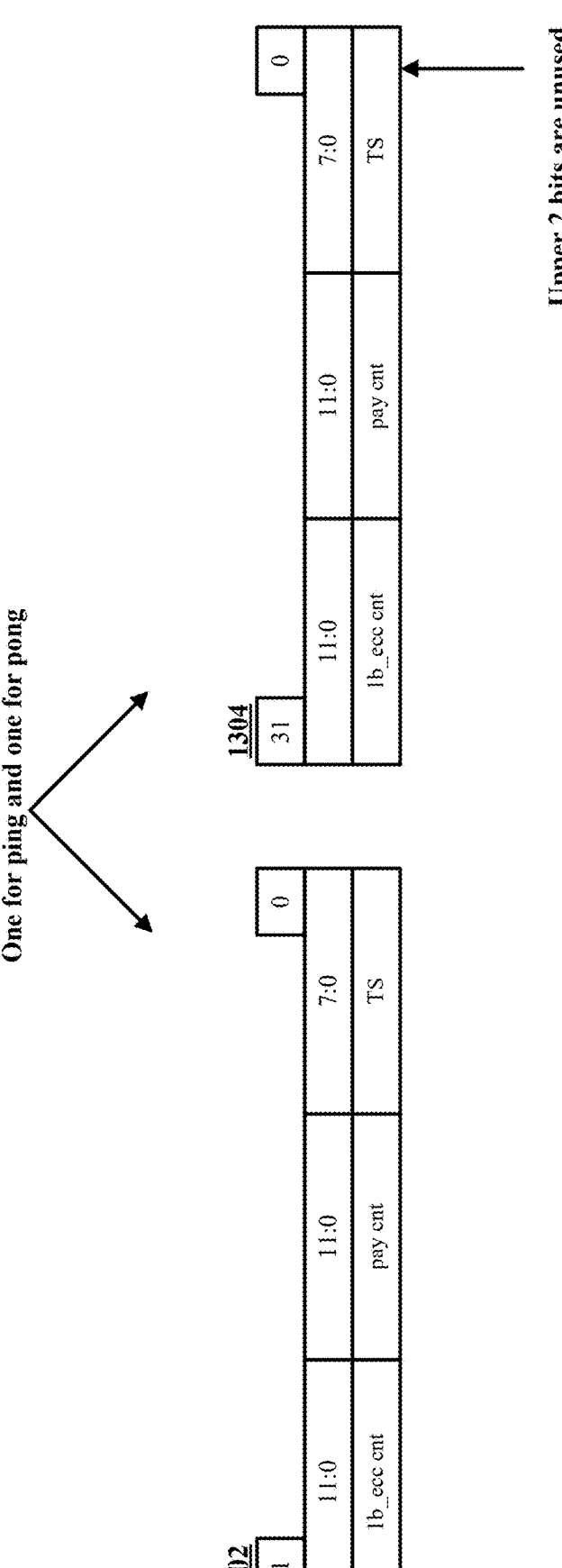
FIG. 13 is a diagram illustrating an example of grouping counter and timestamp bits.

FIG. 13 is a diagram 1300 illustrating an example of grouping counter and timestamp bits. There may be a first register 1302 for ping and a second register 1304 for pong. Each of the first register 1302 for ping and the second register 1304 for pong may include twelve bits for error count, twelve bits for payload count, and eight bits for timestamp, totaling thirty-two bits.

FIG. 14 is a diagram 1400 illustrating an example of interrupt request (IRQ) hierarchy 1410 and SW sequence 1430. Payload CRC IRQ status 1412 and payload CRC IRQ status 1414, which may each have X bits, may be combined based on an OR circuit into CSI RX IRQ status 1416. The CSI RX IRQ status 1416 may be further may be combined based on an OR circuit into CSI RX IRQ status 1418, which result in top IRQ status 1420. The top IRQ status 1420 may be further combined based on an OR circuit into output CSI data 1422 to CPU. For SW sequence 1430, the following sequence may be used:

Read TOP_IRQ_STATUS 1432

Write    TOP_IRQ_CLEAR—preparation    to    clear TOP_IRQ_STATUS

Read CSI2_RX_IRQ_STATUS 1434

Write  CSI2_RX_IRQ_CLEAR—preparation  to  clear CSI2_RX_IRQ_STATUS 1434

Read PAYLOAD_CRC_IRQ_STATUS_0 1436

Write   PAYLOAD_CRC_IRQ_CLEAR_0—preparation to clear PAYLOAD_CRC_IRQ_STATUS_0 1436

Read PAYLOAD_CRC_IRQ_STATUS_1 1438

Write   PAYLOAD_CRC_IRQ_CLEAR_1—preparation to clear PAYLOAD_CRC_IRQ_STATUS_1 1438

Issue global clear command-clear all above status registers at once.

Read  ERRCNT_TS_PING_VCx  (e.g.,  ping  register 1440)

Read  ERRCNT_TS_PONG_VCx  (e.g.,  pong  register 1442)

Figure 15:
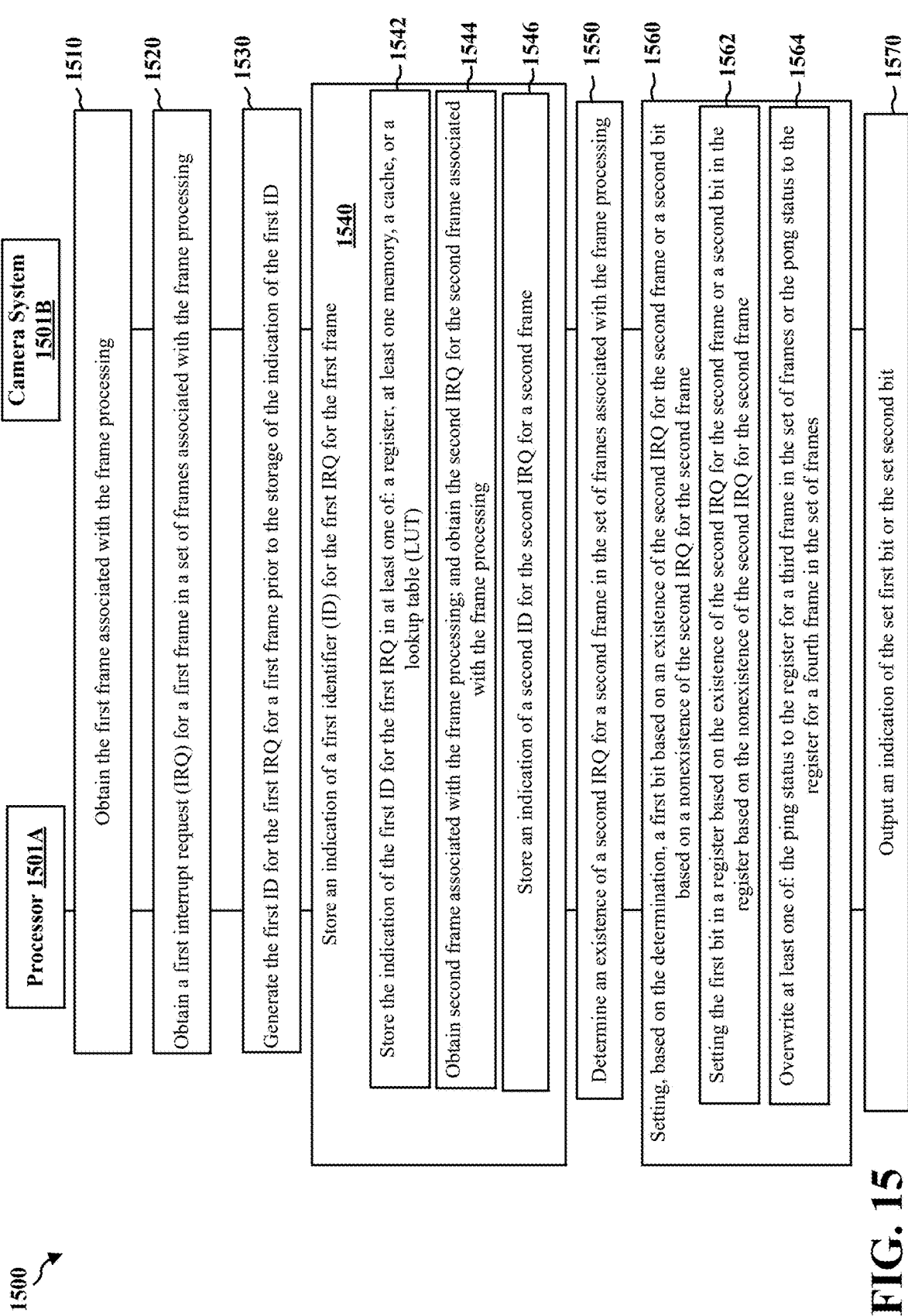
FIG. 15 is a diagram illustrating an example of communication flow between at least one processor and a camera system.

FIG. 15 is a diagram 1500 illustrating an example of communication flow between at least one processor 1501A and a camera system 1501B. The at least one processor 1501A may be a vehicle, a vehicle component, a controller circuit, a system-on-chip (SoC), an electronic control unit (ECU), a user equipment (UE), a graphics processing unit (GPU), a central processing unit (CPU), or any apparatus that may perform communication), and a camera system 1501B (e.g., an image sensor), in accordance with one or more techniques of this disclosure.

At 1510, the at least one processor 1501A may obtain the first frame associated with the frame processing, where the obtainment of the first IRQ is based on the obtained first frame.

At 1520, the at least one processor 1501A may obtain a first interrupt request (IRQ) for a first frame in a set of frames associated with the frame processing. In some aspects, obtain the first IRQ may include receive the first IRQ from a camera subsystem including a mobile industry processor interface (MIPI) camera serial interface (CSI) receiver. In some aspects, the first IRQ is associated with an error for the first frame, and where the error corresponds to at least one of: an error correction code (ECC) or a packet payload checksum.

At 1530, the at least one processor 1501A may generate the first ID for the first IRQ for the first frame prior to storage of the indication of the first ID.

At 1540, the at least one processor 1501A may store an indication of a first identifier (ID) for the first IRQ for the first frame.

As part of 1540, at 1542, the at least one processor 1501A may store the indication of the first ID for the first IRQ in at least one of: a register, the at least one memory, a cache, or a lookup table (LUT). In some aspects, the register is at least one of an IRQ status register or a timestamp register, where the IRQ status register includes a bit that is associated with the timestamp register. In some aspects, the first ID for the first IRQ for the first frame includes a first timestamp.

As part of 1540, at 1544, the at least one processor 1501A may obtain the second frame associated with the frame processing and obtain the second IRQ for the second frame associated with the frame processing.

As part of 1540, at 1546, the at least one processor 1501A may store an indication of a second ID for the second IRQ for the second frame.

At 1550, the at least one processor 1501A may determine an existence of a second IRQ for a second frame in the set of frames associated with the frame processing, where the second frame is subsequent to the first frame in the set of frames.

At 1560, the at least one processor 1501A may set, based on the determination, a first bit based on the existence of the second IRQ for the second frame or a second bit based on a nonexistence of the second IRQ for the second frame.

As part of 1560, at 1562, the at least one processor 1501A may set the first bit in a register based on the existence of the second IRQ for the second frame or the second bit in the register based on the nonexistence of the second IRQ for the second frame. In some aspects, the first bit corresponds to a ping status in the register, and where the second bit in the register corresponds to a pong status in the register. In some aspects, the register is a IRQ status register, and where the first bit points to a ping ID in a timestamp register and the second bit points to a pong ID in the timestamp register. In some aspects, the ping status in the register corresponds to odd frames in the set of frames, and where the pong status in the register corresponds to even frames in the set of frames. In some aspects, set the first bit in the register may include write the ping status to the register and set the second bit in the register may include write the pong status to the register.

As part of 1560, at 1564, the at least one processor 1501A may overwrite at least one of the ping status to the register for a third frame in the set of frames or the pong status to the register for a fourth frame in the set of frames, where the third frame is subsequent to the second frame in the set of frames and the fourth frame is subsequent to the third frame in the set of frames. In some aspects, in addition to ping status and pong status, more than two types of status and associated types of registers may be used. For example, there may be a first type of register, a second type of register, and a third type of register. A first frame may be based on the first type of register, a second frame may be based on the second type of register, and a third frame may be based on the third type of register. A fourth frame may overwrite to the first type of register, a fifth frame may overwrite to the second type of register, and a sixth frame may overwrite to the third type of register. As another example, N types of register may be used and the frames may be written and overwritten into the N types of registers in a circular manner, N being a positive integer. For example, information of a first frame may be written into the first register, information of a second frame may be written into the second register, . . . information of a Nth frame may be written into the Nth register, and information of N+1th frame may be written into the first register.

At 1570, the at least one processor 1501A may output an indication of the set first bit or the set second bit. Output the indication may include transmit the indication of the set first bit or the set second bit or store the indication of the set first bit or the set second bit.

FIG. 16 is a flowchart 1600 of a method of wireless communication. The method may be performed by at least one processor at a vehicle (e.g., the UE 104, the at least one processor 1501A; the apparatus 1804).

At 1620, the at least one processor may obtain a first interrupt request (IRQ) for a first frame in a set of frames associated with the frame processing. For example, the at least one processor 1501A may (e.g., at 1520) obtain a first interrupt request (IRQ) for a first frame in a set of frames associated with the frame processing. In some aspects, 1620 may be performed by frame processing component 198. In some aspects, the first IRQ is associated with an error for the first frame, and where the error corresponds to at least one of: an error correction code (ECC) or a packet payload checksum. In some aspects, to obtain the first IRQ, the at least one processor may receive the first IRQ from a camera subsystem including a mobile industry processor interface (MIPI) camera serial interface (CSI) receiver. In some aspects, the first ID for the first IRQ for the first frame includes a first timestamp.

At 1640, the at least one processor may store an indication of a first identifier (ID) for the first IRQ for the first frame. For example, the at least one processor 1501A may store (e.g., at 1540) an indication of a first identifier (ID) for the first IRQ for the first frame. In some aspects, 1640 may be performed by frame processing component 198.

At 1650, the at least one processor may determine an existence of a second IRQ for a second frame in the set of frames associated with the frame processing, where the second frame is subsequent to the first frame in the set of frames. For example, the at least one processor 1501A may (e.g., at 1550) determine an existence of a second IRQ for a second frame in the set of frames associated with the frame processing, where the second frame is subsequent to the first frame in the set of frames. In some aspects, 1650 may be performed by frame processing component 198.

At 1660, the at least one processor may set, based on the determination, a first bit based on the existence of the second IRQ for the second frame or a second bit based on a nonexistence of the second IRQ for the second frame. For example, the at least one processor 1501A may set (e.g., at 1560), based on the determination, a first bit based on the existence of the second IRQ for the second frame or a second bit based on a nonexistence of the second IRQ for the second frame. In some aspects, 1660 may be performed by frame processing component 198.

FIG. 17 is a flowchart 1700 of a method of wireless communication. The method may be performed by at least one processor at a vehicle (e.g., the UE 104, the at least one processor 1501A; the apparatus 1804).

At 1710, the at least one processor may obtain the first frame associated with the frame processing, where the obtainment of the first IRQ is based on the obtained first frame. For example, the at least one processor 1501A may (e.g., 1510) obtain the first frame associated with the frame processing, where the obtainment of the first IRQ is based on the obtained first frame. In some aspects, 1710 may be performed by frame processing component 198.

At 1720, the at least one processor may obtain a first interrupt request (IRQ) for a first frame in a set of frames associated with the frame processing. For example, the at least one processor 1501A may (e.g., at 1520) obtain a first interrupt request (IRQ) for a first frame in a set of frames associated with the frame processing. In some aspects, 1720 may be performed by frame processing component 198. In some aspects, the first IRQ is associated with an error for the first frame, and where the error corresponds to at least one of: an error correction code (ECC) or a packet payload checksum. In some aspects, to obtain the first IRQ, the at least one processor may receive the first IRQ from a camera subsystem including a mobile industry processor interface (MIPI) camera serial interface (CSI) receiver. In some aspects, the first ID for the first IRQ for the first frame includes a first timestamp.

In some aspects, the at least one processor (e.g., 1501A) may generate the first ID for the first IRQ for the first frame prior to storage of the indication of the first ID (e.g., at 1530).

At 1740, the at least one processor may store an indication of a first identifier (ID) for the first IRQ for the first frame. For example, the at least one processor 1501A may store (e.g., at 1540) an indication of a first identifier (ID) for the first IRQ for the first frame. In some aspects, 1740 may be performed by frame processing component 198.

At 1742, the at least one processor may store the indication of the first ID for the first IRQ in at least one of: a register, the at least one memory, a cache, or a lookup table (LUT). For example, the at least one processor 1501A may (e.g., at 1542) store the indication of the first ID for the first IRQ in at least one of: a register, the at least one memory, a cache, or a lookup table (LUT). In some aspects, 1742 may be performed by frame processing component 198. In some aspects, the register is at least one of an IRQ status register or a timestamp register, where the IRQ status register includes a bit that is associated with the timestamp register.

At 1744, the at least one processor may obtain the second frame associated with the frame processing and obtain the second IRQ for the second frame associated with the frame processing. For example, the at least one processor 1501A may obtain the second frame associated with the frame processing and obtain the second IRQ for the second frame associated with the frame processing. In some aspects, 1744 may be performed by frame processing component 198.

At 1746, the at least one processor may (e.g., at 1546) store an indication of a second ID for the second IRQ for the second frame. For example, the at least one processor 1501A may store an indication of a second ID for the second IRQ for the second frame. In some aspects, 1746 may be performed by frame processing component 198.

At 1750, the at least one processor may determine an existence of a second IRQ for a second frame in the set of frames associated with the frame processing, where the second frame is subsequent to the first frame in the set of frames. For example, the at least one processor 1501A may (e.g., at 1550) determine an existence of a second IRQ for a second frame in the set of frames associated with the frame processing, where the second frame is subsequent to the first frame in the set of frames. In some aspects, 1750 may be performed by frame processing component 198.

At 1760, the at least one processor may set, based on the determination, a first bit based on the existence of the second IRQ for the second frame or a second bit based on a nonexistence of the second IRQ for the second frame. For example, the at least one processor 1501A may set (e.g., at 1560), based on the determination, a first bit based on the existence of the second IRQ for the second frame or a second bit based on a nonexistence of the second IRQ for the second frame. In some aspects, 1760 may be performed by frame processing component 198.

At 1762, the at least one processor may set the first bit in a register based on the existence of the second IRQ for the second frame or the second bit in the register based on the nonexistence of the second IRQ for the second frame. For example, the at least one processor 1501A may (e.g., at 1562) set the first bit in a register based on the existence of the second IRQ for the second frame or the second bit in the register based on the nonexistence of the second IRQ for the second frame. In some aspects, 1762 may be performed by frame processing component 198. In some aspects, the first bit corresponds to a ping status in the register, and where the second bit in the register corresponds to a pong status in the register. In some aspects, the register is a IRQ status register, and where the first bit points to a ping ID in a timestamp register and the second bit points to a pong ID in the timestamp register. In some aspects, the ping status in the register corresponds to odd frames in the set of frames, and where the pong status in the register corresponds to even frames in the set of frames. In some aspects, set the first bit in the register may include write the ping status to the register and set the second bit in the register may include write the pong status to the register.

At 1764, the at least one processor may overwrite at least one of the ping status to the register for a third frame in the set of frames or the pong status to the register for a fourth frame in the set of frames, where the third frame is subsequent to the second frame in the set of frames and the fourth frame is subsequent to the third frame in the set of frames. For example, the at least one processor 1501A may (e.g., at 1564) overwrite at least one of the ping status to the register for a third frame in the set of frames or the pong status to the register for a fourth frame in the set of frames, where the third frame is subsequent to the second frame in the set of frames and the fourth frame is subsequent to the third frame in the set of frames. In some aspects, 1764 may be performed by frame processing component 198.

At 1770, the at least one processor may output an indication of the set first bit or the set second bit. For example, the at least one processor 1501A may (e.g., at 1570) output an indication of the set first bit or the set second bit. In some aspects, 1770 may be performed by frame processing component 198. Output the indication may include transmit the indication of the set first bit or the set second bit or store the indication of the set first bit or the set second bit.

Figure 18:
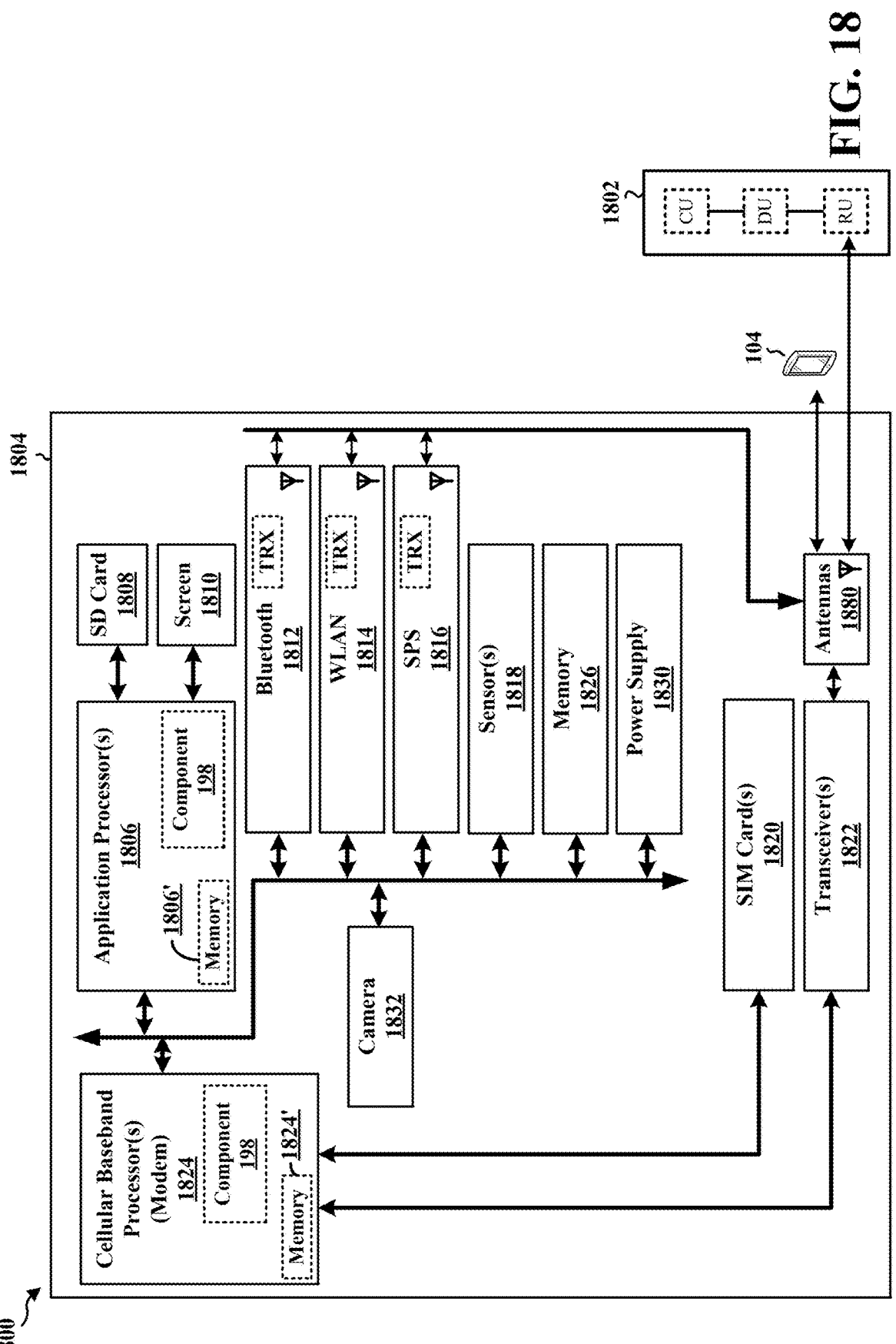
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include at least one cellular baseband processor 1824 (also referred to as a modem) coupled to one or more transceivers 1822 (e.g., cellular RF transceiver). The cellular baseband processor(s) 1824 may include at least one on-chip memory 1824'. In some aspects, the apparatus 1804 may further include one or more subscriber identity modules (SIM) cards 1820 and at least one application processor 1806 coupled to a secure digital (SD) card 1808 and a screen 1810. The application processor(s) 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor(s) 1824 communicates through the transceiver(s) 1822 via one or more antennas 1880 with the UE 104 and/or with an RU associated with a network entity 1802. The cellular baseband processor(s) 1824 and the application processor(s) 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor(s) 1824 and the application processor(s) 1806 are each responsible for general processing, including the execution of software stored on the computer-readable medium/memory. The software, when executed by the cellular baseband processor(s) 1824/application processor(s) 1806, causes the cellular baseband processor(s) 1824/application processor(s) 1806 to perform the various functions described supra. The computer-readable medium/memory may also be used for storing data that is manipulated by the cellular baseband processor(s) 1824/application processor(s) 1806 when executing software. The cellular baseband processor(s) 1824/application processor(s) 1806 may be a component of the UE 350 and may include the at least one memory 360 and/or at least one of the TX processor 368, the RX processor 356, and the controller/processor 359. In one configuration, the apparatus 1804 may be at least one processor chip (modem and/or application) and include just the cellular baseband processor(s) 1824 and/or the application processor(s) 1806, and in another configuration, the apparatus 1804 may be the entire UE (e.g., see UE 350 of FIG. 3) and include the additional modules of the apparatus 1804.

As discussed supra, the frame processing component 198 may be configured to obtain a first interrupt request (IRQ) for a first frame in a set of frames associated with the frame processing. The frame processing component 198 may also be configured to store an indication of a first identifier (ID) for the first IRQ for the first frame. The frame processing component 198 may also be configured to determine an existence of a second IRQ for a second frame in the set of frames associated with the frame processing, where the second frame is subsequent to the first frame in the set of frames. The frame processing component 198 may also be configured to set, based on the determination, a first bit based on the existence of the second IRQ for the second frame or a second bit based on a nonexistence of the second IRQ for the second frame. The frame processing component 198 may be within the cellular baseband processor(s) 1824, the application processor(s) 1806, or both the cellular baseband processor(s) 1824 and the application processor(s) 1806. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1804 may include a variety of components configured for various functions. In one configuration, the apparatus 1804, and in particular the cellular baseband processor(s) 1824 and/or the application processor(s) 1806, may include means for obtaining a first interrupt request (IRQ) for a first frame in a set of frames associated with the frame processing. In some aspects, the apparatus 1804 may include means for storing an indication of a first identifier (ID) for the first IRQ for the first frame. In some aspects, the apparatus 1804 may include means for determining an existence of a second IRQ for a second frame in the set of frames associated with the frame processing, where the second frame is subsequent to the first frame in the set of frames. In some aspects, the apparatus 1804 may include means for setting, based on the determination, a first bit based on the existence of the second IRQ for the second frame or a second bit based on a nonexistence of the second IRQ for the second frame. In some aspects, the apparatus 1804 may include means for setting the first bit in a register based on the existence of the second IRQ for the second frame or the second bit in the register based on the nonexistence of the second IRQ for the second frame. In some aspects, the apparatus 1804 may include means for writing the pong status to the register. In some aspects, the apparatus 1804 may include means for writing the ping status to the register. In some aspects, the apparatus 1804 may include means for overwriting at least one of the ping status to the register for a third frame in the set of frames or the pong status to the register for a fourth frame in the set of frames, where the third frame is subsequent to the second frame in the set of frames and the fourth frame is subsequent to the third frame in the set of frames. In some aspects, the apparatus 1804 may include means for storing the indication of the first ID for the first IRQ in at least one of: a register, the at least one memory, a cache, or a lookup table (LUT). In some aspects, the apparatus 1804 may include means for obtaining the second frame associated with the frame processing. In some aspects, the apparatus 1804 may include means for obtaining the second IRQ for the second frame associated with the frame processing. In some aspects, the apparatus 1804 may include means for storing an indication of a second ID for the second IRQ for the second frame. In some aspects, the apparatus 1804 may include means for obtaining the first frame associated with the frame processing, where the obtainment of the first IRQ is based on the obtained first frame. In some aspects, the apparatus 1804 may include means for receiving the first IRQ from a camera subsystem including a mobile industry processor interface (MIPI) camera serial interface (CSI) receiver. In some aspects, the apparatus 1804 may include means for generating the first ID for the first IRQ for the first frame prior to storage of the indication of the first ID. In some aspects, the apparatus 1804 may include means for outputting an indication of the set first bit or the set second bit. In some aspects, the apparatus 1804 may include means for transmitting the indication of the set first bit or the set second bit. In some aspects, the apparatus 1804 may include means for storing the indication of the set first bit or the set second bit. The means may be the component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for frame processing, including: at least one memory; and at least one processor coupled to the at least one memory and, based at least in part on information stored in the at least one memory, the at least one processor, individually or in any combination, is configured to: obtain a first interrupt request (IRQ) for a first frame in a set of frames associated with the frame processing; store an indication of a first identifier (ID) for the first IRQ for the first frame; determine an existence of a second IRQ for a second frame in the set of frames associated with the frame processing, where the second frame is subsequent to the first frame in the set of frames; and set, based on the determination, a first bit based on the existence of the second IRQ for the second frame or a second bit based on a nonexistence of the second IRQ for the second frame.

Aspect 2 is the apparatus of aspect 1, where to set the first bit based on the existence of the second IRQ for the second frame or the second bit based on the nonexistence of the second IRQ for the second frame, the at least one processor, individually or in any combination, is configured to: set the first bit in a register based on the existence of the second IRQ for the second frame or the second bit in the register based on the nonexistence of the second IRQ for the second frame.

Aspect 3 is the apparatus of aspect 2, where the first bit corresponds to a ping status in the register, and where the second bit in the register corresponds to a pong status in the register.

Aspect 4 is the apparatus of aspect 3, where the register is a IRQ status register, and where the first bit points to a ping ID in a timestamp register and the second bit points to a pong ID in the timestamp register.

Aspect 5 is the apparatus of any of aspects 3-4, where the ping status in the register corresponds to odd frames in the set of frames, and where the pong status in the register corresponds to even frames in the set of frames.

Aspect 6 is the apparatus of any of aspects 3-5, where to set the first bit in the register, the at least one processor, individually or in any combination, is configured to write the ping status to the register; and where to set the second bit in the register, the at least one processor, individually or in any combination, is configured to write the pong status to the register.

Aspect 7 is the apparatus of aspect 6, where the at least one processor, individually or in any combination, is further configured to: overwrite at least one of the ping status to the register for a third frame in the set of frames or the pong status to the register for a fourth frame in the set of frames, where the third frame is subsequent to the second frame in the set of frames and the fourth frame is subsequent to the third frame in the set of frames.

Aspect 8 is the apparatus of any of aspects 1-7, where to store the indication of the first ID for the first IRQ, the at least one processor, individually or in any combination, is configured to: store the indication of the first ID for the first IRQ in at least one of: a register, the at least one memory, a cache, or a lookup table (LUT).

Aspect 9 is the apparatus of aspect 8, where the register is at least one of an IRQ status register or a timestamp register, where the IRQ status register includes a bit that is associated with the timestamp register.

Aspect 10 is the apparatus of any of aspects 1-9, where the first ID for the first IRQ for the first frame includes a first timestamp.

Aspect 11 is the apparatus of any of aspects 1-10, where the at least one processor, individually or in any combination, is further configured to: obtain the second frame associated with the frame processing; and obtain the second IRQ for the second frame associated with the frame processing.

Aspect 12 is the apparatus of aspect 11, where the at least one processor, individually or in any combination, is further configured to: store an indication of a second ID for the second IRQ for the second frame.

Aspect 13 is the apparatus of any of aspects 1-12, where the at least one processor, individually or in any combination, is further configured to: obtain the first frame associated with the frame processing, where the obtainment of the first IRQ is based on the obtained first frame.

Aspect 14 is the apparatus of any of aspects 1-13, where to obtain the first IRQ for the first frame, the at least one processor, individually or in any combination, is configured to: receive the first IRQ from a camera subsystem including a mobile industry processor interface (MIPI) camera serial interface (CSI) receiver.

Aspect 15 is the apparatus of any of aspects 1-14, where the first IRQ is associated with an error for the first frame, and where the error corresponds to at least one of: an error correction code (ECC) or a packet payload checksum.

Aspect 16 is the apparatus of any of aspects 1-15, where the at least one processor, individually or in any combination, is further configured to: generate the first ID for the first IRQ for the first frame prior to storage of the indication of the first ID.

Aspect 17 is the apparatus of any of aspects 1-16, where the at least one processor, individually or in any combination, is further configured to: output an indication of the set first bit or the set second bit.

Aspect 18 is the apparatus of any of aspects 1-17, where to output the indication of the set first bit or the set second bit, the at least one processor, individually or in any combination, is configured to: transmit the indication of the set first bit or the set second bit; or store the indication of the set first bit or the set second bit.

Aspect 19 is a method of wireless communication for implementing any of aspects 1 to 18.

Aspect 20 is an apparatus for wireless communication including means for implementing any of aspects 1 to 18.

Aspect 21 is a computer-readable medium (e.g., a non-transitory computer-readable medium) storing computer executable code, the code when executed by at least one processor causes the at least one processor to implement any of aspects 1 to 18.

What is claimed is:

1. An apparatus for frame processing, comprising:
at least one memory; and
at least one processor coupled to the at least one memory and, based at least in part on information stored in the at least one memory, the at least one processor, individually or in any combination, is configured to:
obtain a first interrupt request (IRQ) for a first frame in a set of frames associated with the frame processing;
store an indication of a first identifier (ID) for the first IRQ for the first frame;
determine an existence of a second IRQ for a second frame in the set of frames associated with the frame processing, wherein the second frame is subsequent to the first frame in the set of frames; and
set, based on the determination, a first bit based on the existence of the second IRQ for the second frame or a second bit based on a nonexistence of the second IRQ for the second frame.

2. The apparatus of claim 1, wherein to set the first bit based on the existence of the second IRQ for the second frame or the second bit based on the nonexistence of the second IRQ for the second frame, the at least one processor, individually or in any combination, is configured to:
set the first bit in a register based on the existence of the second IRQ for the second frame or the second bit in the register based on the nonexistence of the second IRQ for the second frame.

3. The apparatus of claim 2, wherein the first bit corresponds to a ping status in the register, and wherein the second bit in the register corresponds to a pong status in the register.

4. The apparatus of claim 3, wherein the register is a IRQ status register, and wherein the first bit points to a ping ID in a timestamp register and the second bit points to a pong ID in the timestamp register.

5. The apparatus of claim 3, wherein the ping status in the register corresponds to odd frames in the set of frames, and wherein the pong status in the register corresponds to even frames in the set of frames.

6. The apparatus of claim 3, wherein to set the first bit in the register, the at least one processor, individually or in any combination, is configured to write the ping status to the register; and wherein to set the second bit in the register, the at least one processor, individually or in any combination, is configured to write the pong status to the register.

7. The apparatus of claim 6, wherein the at least one processor, individually or in any combination, is further configured to:

overwrite at least one of the ping status to the register for a third frame in the set of frames or the pong status to the register for a fourth frame in the set of frames, wherein the third frame is subsequent to the second frame in the set of frames and the fourth frame is subsequent to the third frame in the set of frames.

8. The apparatus of claim 1, wherein to store the indication of the first ID for the first IRQ, the at least one processor, individually or in any combination, is configured to:

store the indication of the first ID for the first IRQ in at least one of: a register, the at least one memory, a cache, or a lookup table (LUT).

9. The apparatus of claim 8, wherein the register is at least one of an IRQ status register or a timestamp register, wherein the IRQ status register includes a bit that is associated with the timestamp register.

10. The apparatus of claim 1, wherein the first ID for the first IRQ for the first frame comprises a first timestamp.

11. The apparatus of claim 1, wherein the at least one processor, individually or in any combination, is further configured to:

obtain the second frame associated with the frame processing; and obtain the second IRQ for the second frame associated with the frame processing.

12. The apparatus of claim 11, wherein the at least one processor, individually or in any combination, is further configured to:

store an indication of a second ID for the second IRQ for the second frame.

13. The apparatus of claim 1, wherein the at least one processor, individually or in any combination, is further configured to:

obtain the first frame associated with the frame processing, wherein the obtainment of the first IRQ is based on the obtained first frame.

14. The apparatus of claim 1, wherein to obtain the first IRQ for the first frame, the at least one processor, individually or in any combination, is configured to:

receive the first IRQ from a camera subsystem including a mobile industry processor interface (MIPI) camera serial interface (CSI) receiver.

15. The apparatus of claim 1, wherein the first IRQ is associated with an error for the first frame, and wherein the error corresponds to at least one of: an error correction code (ECC) or a packet payload checksum.

16. The apparatus of claim 1, wherein the at least one processor, individually or in any combination, is further configured to:

generate the first ID for the first IRQ for the first frame prior to storage of the indication of the first ID.

17. The apparatus of claim 1, wherein the at least one processor, individually or in any combination, is further configured to:

output an indication of the set first bit or the set second bit.

18. The apparatus of claim 1, wherein to output the indication of the set first bit or the set second bit, the at least one processor, individually or in any combination, is configured to:

transmit the indication of the set first bit or the set second bit; or store the indication of the set first bit or the set second bit.

19. A method of frame processing, comprising:

obtaining a first interrupt request (IRQ) for a first frame in a set of frames associated with the frame processing;

storing an indication of a first identifier (ID) for the first IRQ for the first frame;

determining an existence of a second IRQ for a second frame in the set of frames associated with the frame processing, wherein the second frame is subsequent to the first frame in the set of frames; and setting, based on the determination, a first bit based on the existence of the second IRQ for the second frame or a second bit based on a nonexistence of the second IRQ for the second frame.

20. A computer-readable medium storing computer executable code, the code when executed by at least one processor causes the at least one processor to:

obtain a first interrupt request (IRQ) for a first frame in a set of frames associated with frame processing;

store an indication of a first identifier (ID) for the first IRQ for the first frame;

determine an existence of a second IRQ for a second frame in the set of frames associated with the frame processing, wherein the second frame is subsequent to the first frame in the set of frames; and set, based on the determination, a first bit based on the existence of the second IRQ for the second frame or a second bit based on a nonexistence of the second IRQ for the second frame.

* * * * *